United States Patent [19]

Clarke

[11] Patent Number: 4,797,923
[45] Date of Patent: Jan. 10, 1989

[54] SUPER RESOLVING PARTIAL WAVE ANALYZER-TRANSCEIVER

[76] Inventor: William L. Clarke, 2221 Aralia St., Newport Beach, Calif. 92660

[21] Appl. No.: 802,980

[22] Filed: Nov. 29, 1985

[51] Int. Cl.$^4$ ............................................. G10L 1/00
[52] U.S. Cl. ...................................... 381/31; 381/29; 381/43; 364/576; 364/513.5; 364/726; 364/724.12; 324/77 R; 324/77 B
[58] Field of Search ................................... 381/29–43; 364/724, 725, 726, 728, 576, 513.5, 485, 487, 484, 822, 826, 580, 819, 604, 825, 721; 370/19, 21, 23, 32; 324/77 R, 77 B, 77 A, 77 C, 77 K, 77 H

[56] References Cited

U.S. PATENT DOCUMENTS

| | | | |
|---|---|---|---|
| 4,038,495 | 7/1977 | White | 364/513.5 |
| 4,179,586 | 12/1979 | Mathews, Jr. et al. | 364/827 X |
| 4,608,673 | 8/1986 | Lazear | 364/724 X |

OTHER PUBLICATIONS

Non-Iterative and N-Steps Iterative Support-Constrained Deconvolution Algorithms by Remy Prost and Robert Goutte, *Signal Processing II: Theories and Applications,* H. W. Schussler (editor), pp. 495-498, 1983.
Deconvolution When the Convolution Kernel Has No Inverse, by Remy Prost and Robert Goutte, *IEEE Transactions on Acoustics, Speech, and Signal Processing,* vol. ASSP-25, No. 6, Dec. 1977.
Spread Spectrum Systems, R. C. Dixon, published by Wiley & Sons, 1976, p. 151, pp. 150-154.

*Primary Examiner*—William M. Shoop, Jr.
*Assistant Examiner*—Paul Ip
*Attorney, Agent, or Firm*—Don A. Hollingsworth

[57] ABSTRACT

Methods and electronic apparatus for recovering relatively high-resolution information from a partial wave representation of an information signal. According to the invention, there is provided a method of operating on a given partial wave function, or of producing a partial wave representation of an information signal as part of the method. Portions of the partial wave representation of the information signal are synchronously selected as by signal sampling under control of an interpolated high frequency clock. An inverse partial wave representation of the selected portions of the transformed signal is then performed, and the inverse partial wave representation is linearly deconvolved to produce a high resolution equivalent of high-resolution information signal. The invention may include an analytic converter for removing the effects of any dispersion of the partial wave representation. While the concepts involved are universally adaptable to signal processing systems, preferred embodiments of the invention as applied to a modem network and to an interferometer are described.

49 Claims, 25 Drawing Sheets

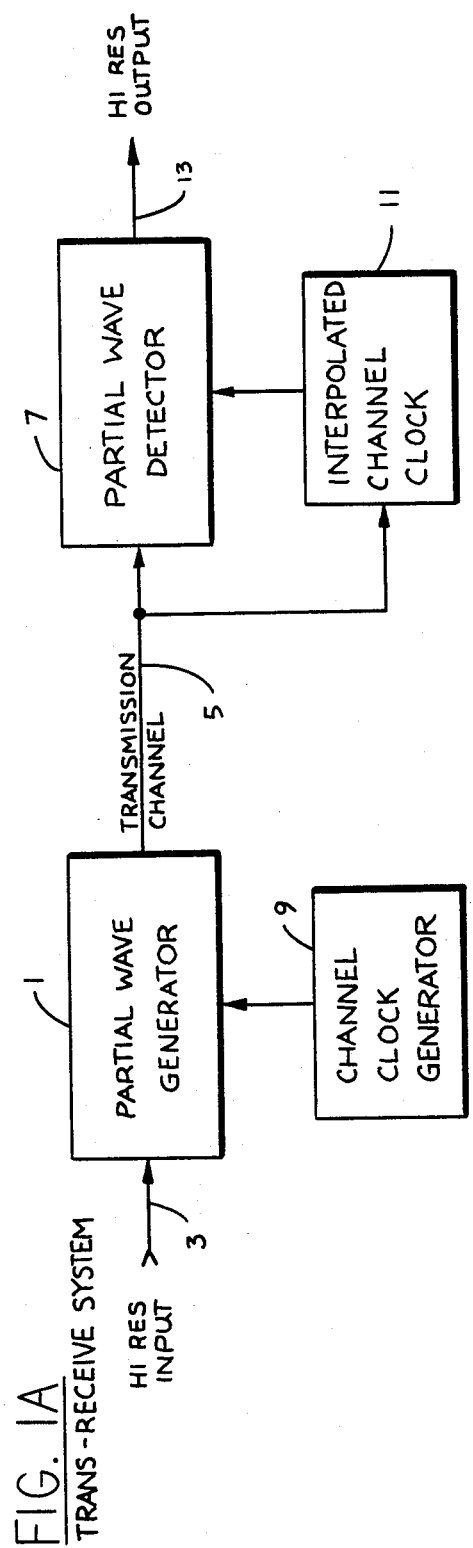
FIG. IA
TRANS-RECEIVE SYSTEM
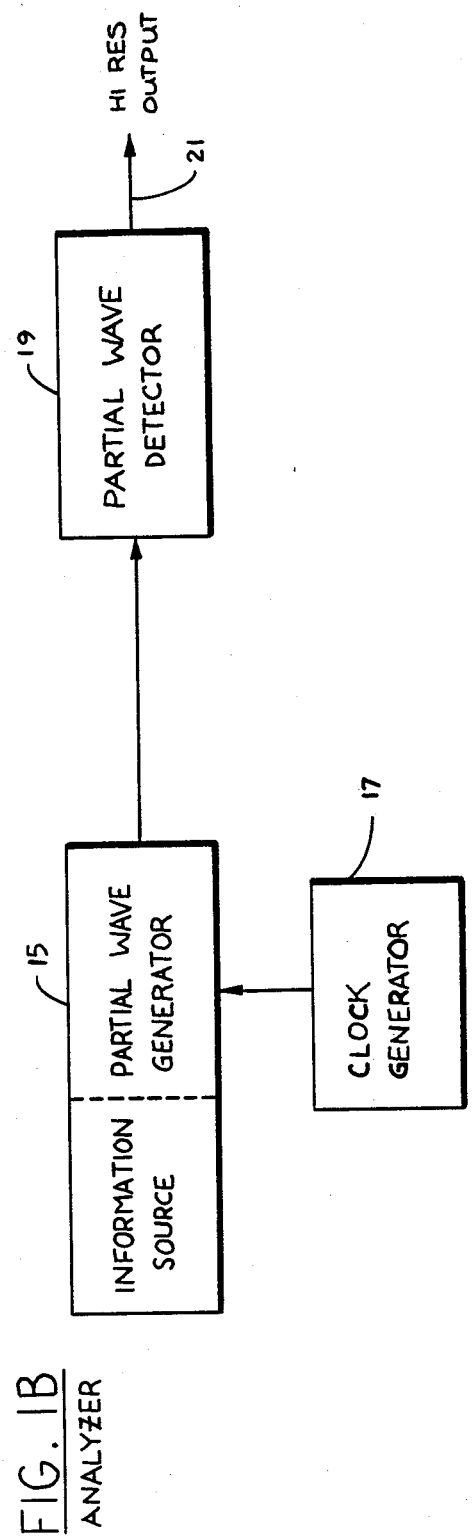
FIG. IB
ANALYZER

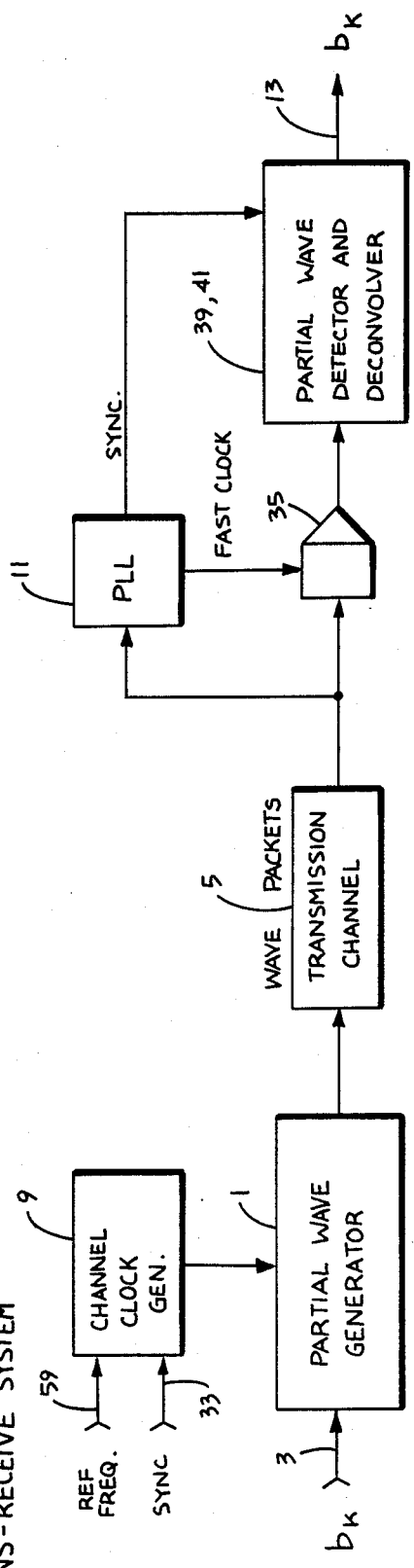
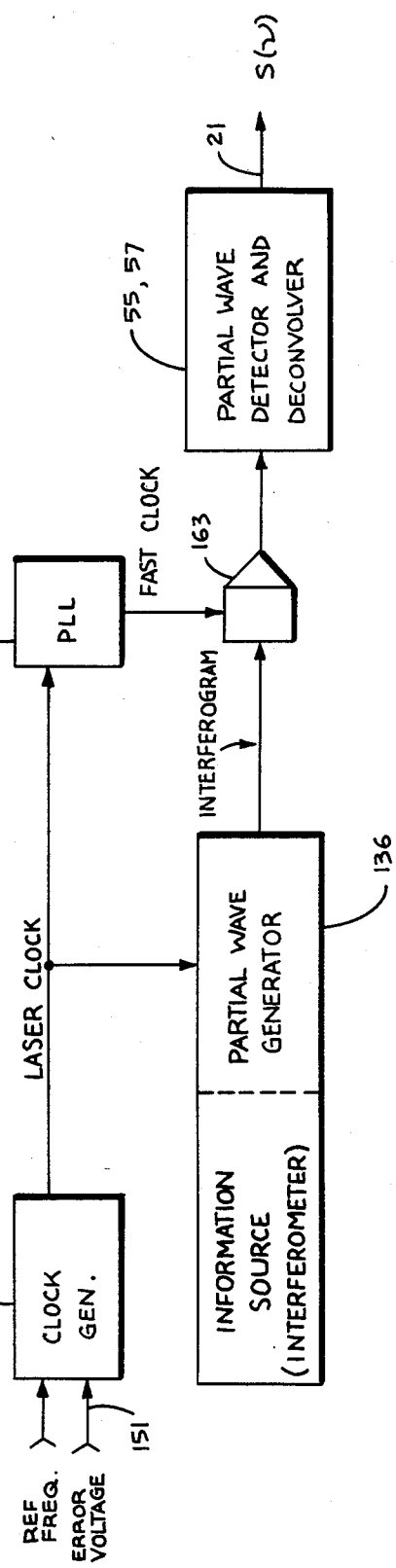
FIG. 2A TRANS-RECEIVE SYSTEM
FIG. 2B ANALYZER

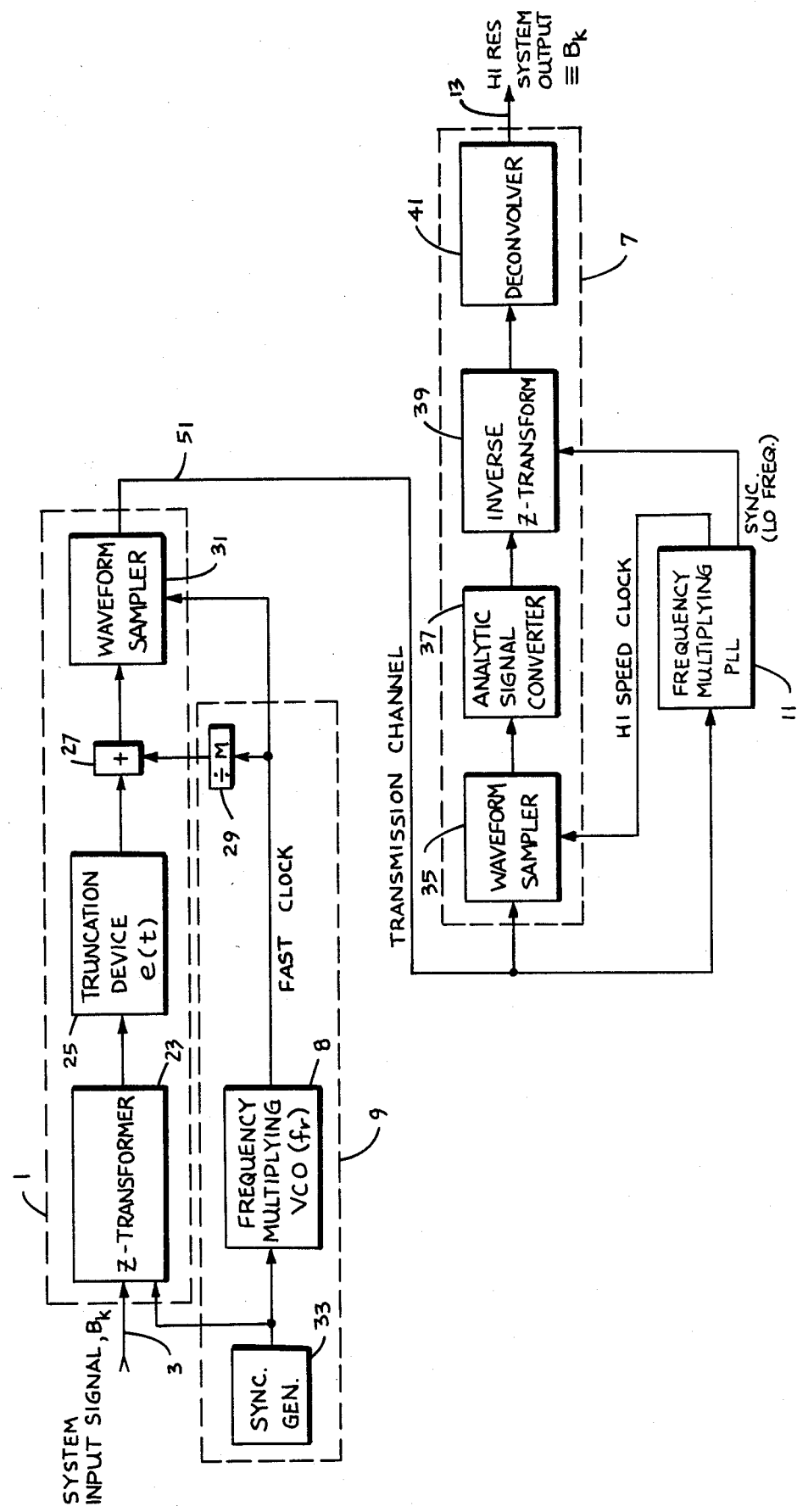

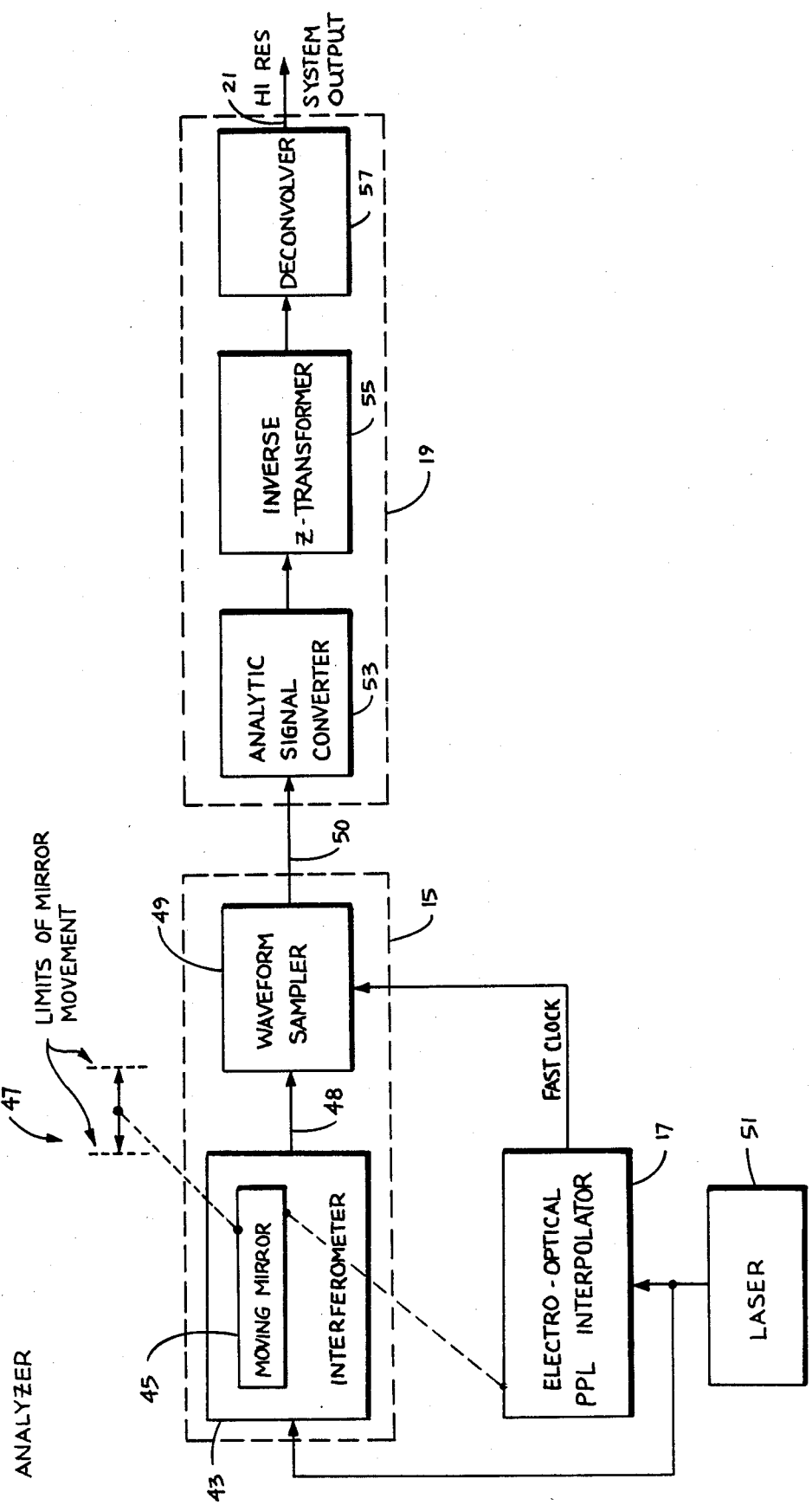

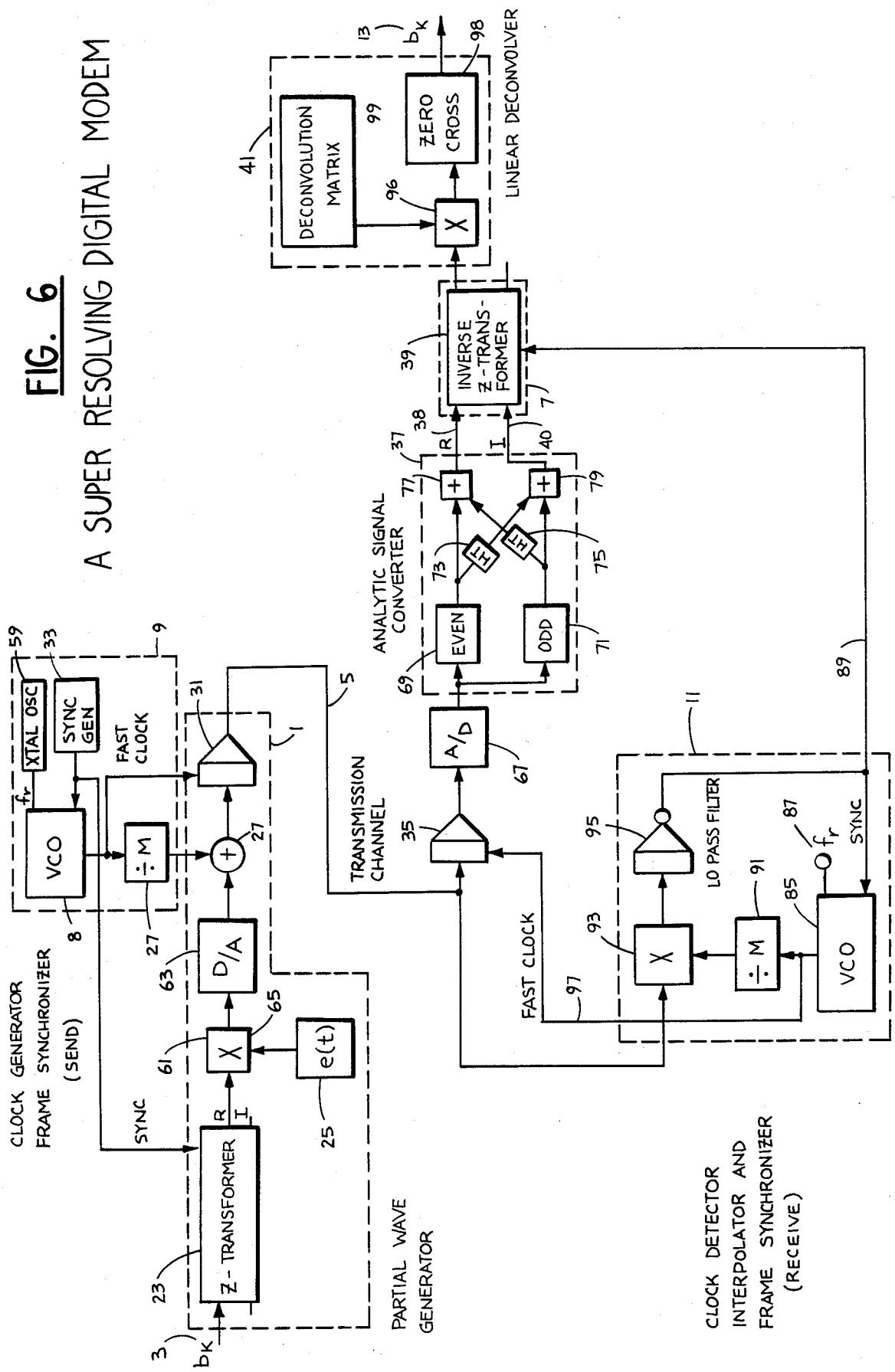
FIG. 6 A SUPER RESOLVING DIGITAL MODEM

FOURIER TRANSFORM OF A
REAL BINARY SEQUENCE

DECOMPOSITION OF X(t) INTO ORTHOGONAL WAVES

DECOMPOSITION OF X(t) INTO PARTIAL WAVES $X(t) \cdot (\text{WINDOW FUNCTION}) = X(t)_{TRUNC}$ $b_{HI}(f) * R(f) = b_{LO}(f)$ CONVOLUTION OF BIT SPECTRUM
DUE TO TRUNCATION OF X(t)

$$x^{(i)}(t) = b_1^{(i)} \left[ e^{i2\pi/N} \right]^t$$

DISCONTINUITIES AT FRAME BOUNDARIES

SUCCESSIVE PARTIAL WAVE PACKETS

USE OF A SPREAD FUNCTION FOR THE ENVELOPE FUNCTION

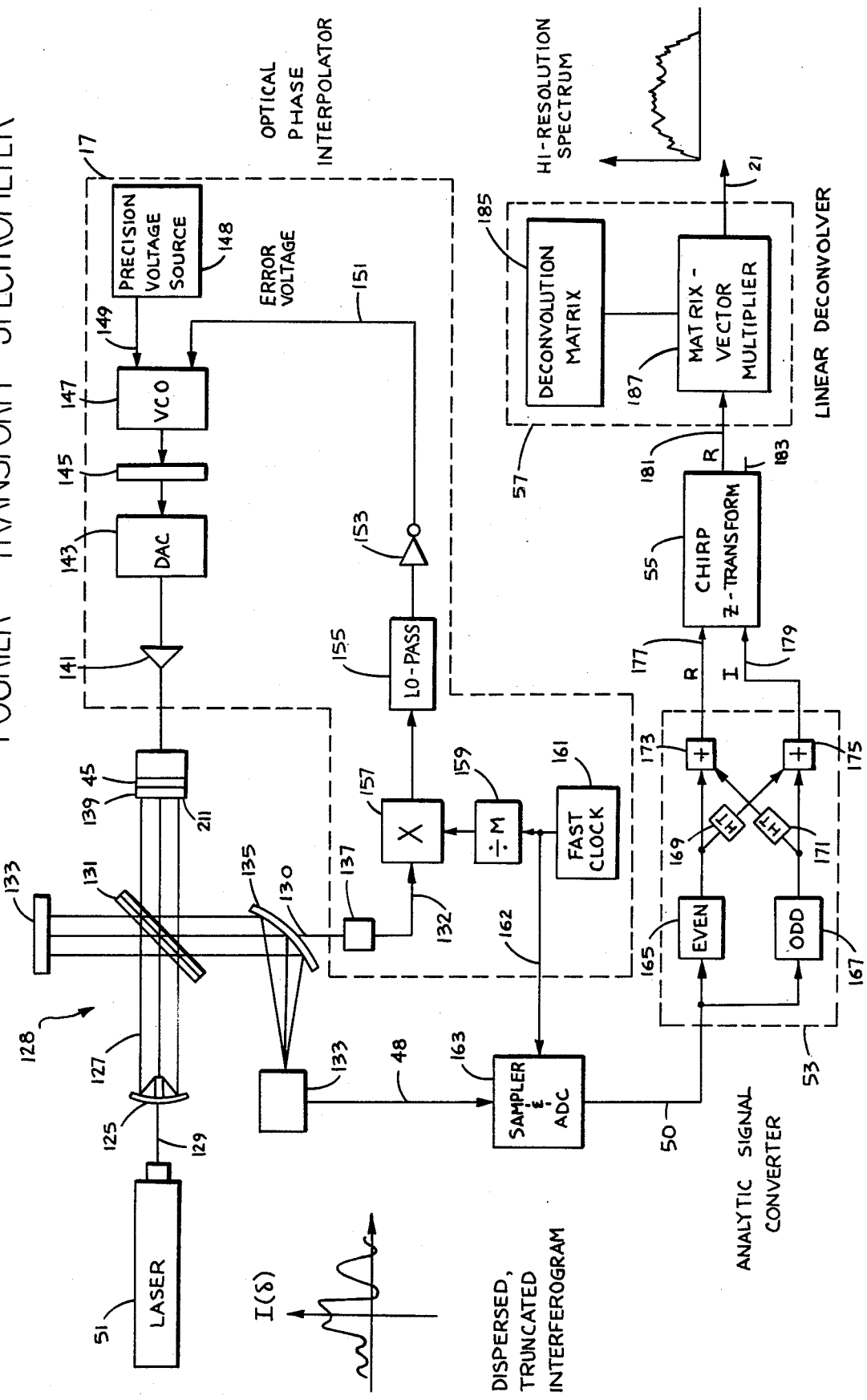
FIG. 12  THE SUPER-RESOLVING FOURIER TRANSFORM SPECTROMETER

FIG. 13  MOVING MIRROR MICHELSON INTERFEROMETER
(PRIOR ART)
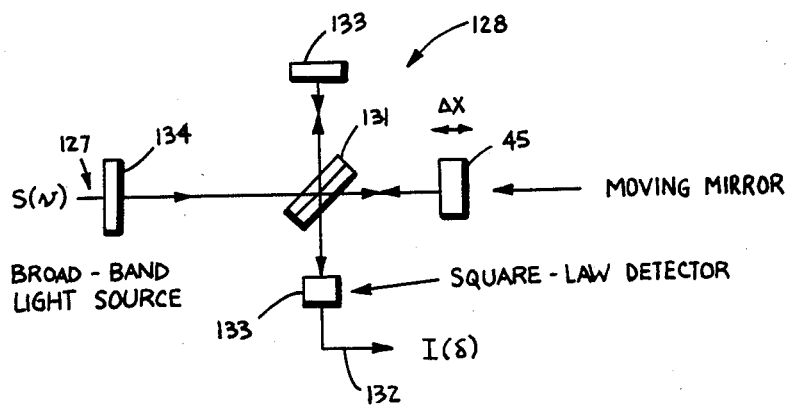
FIG. 14  REFRACTIVELY - SCANNED MICHELSON INTERFEROMETER
(PRIOR ART)
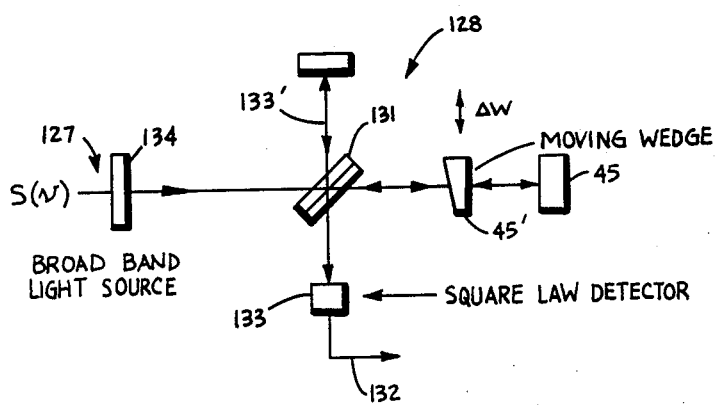
FIG. 15  THE INTERFEROGRAM AND ITS FOURIER TRANSFORM
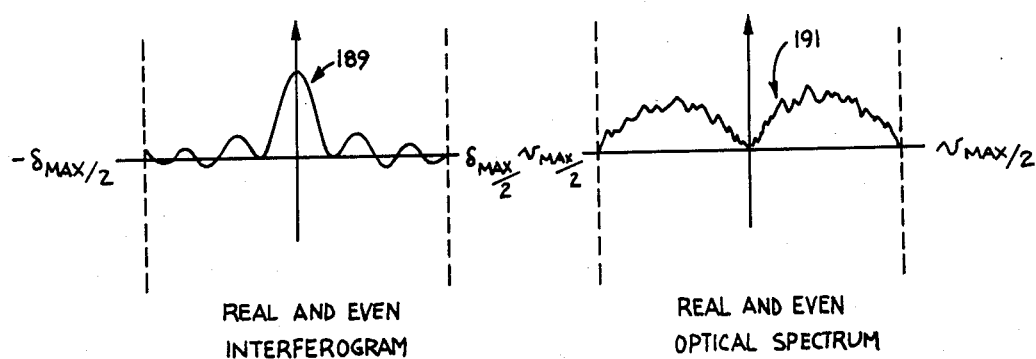
REAL AND EVEN INTERFEROGRAM
REAL AND EVEN OPTICAL SPECTRUM DECOMPOSITION OF INTERFEROGRAM INTO ORTHOGONAL EIGENFUNCTIONS $\Psi_K = \cos[(2\pi/\delta_{max})\delta K]$

FOURIER TRANSFORMS OF EIGENFUNCTIONS

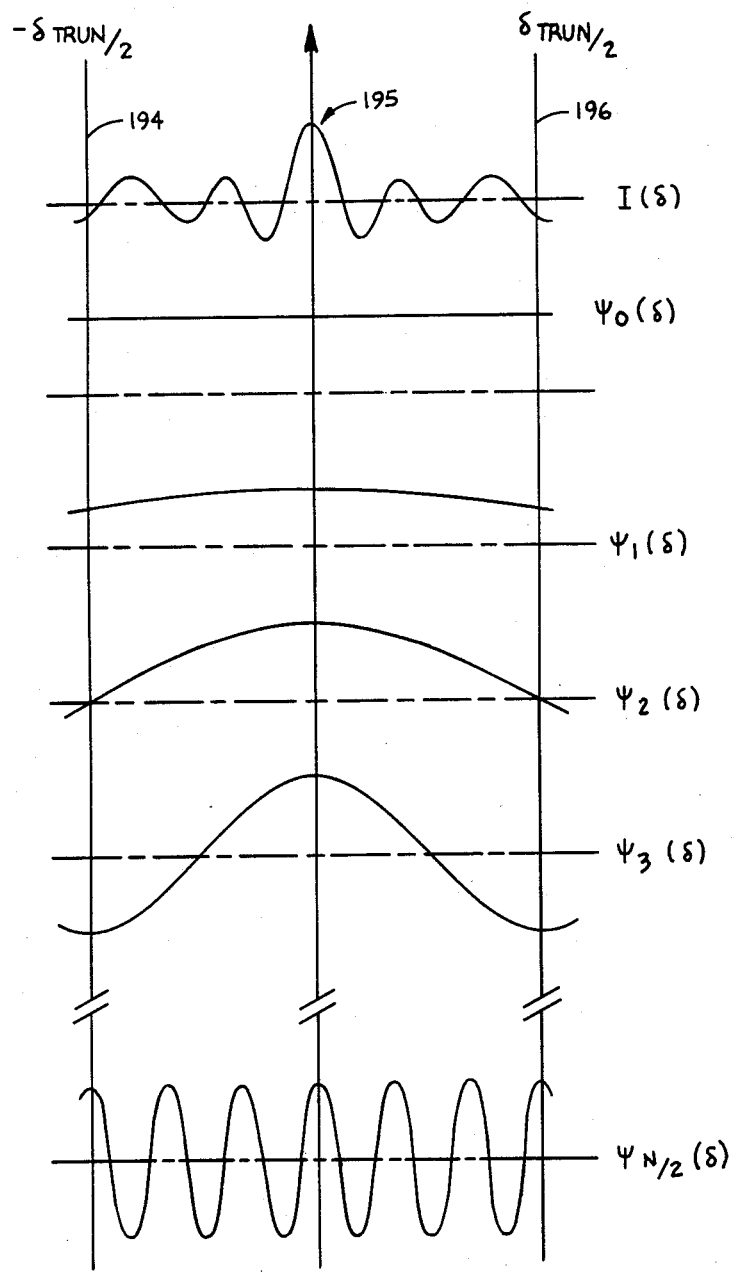
DECOMPOSITION OF INTERFEROGRAM INTO NON-ORTHOGONAL FUNCTIONS (PARTIAL WAVES)

FIG. 19A
FIG. 19B
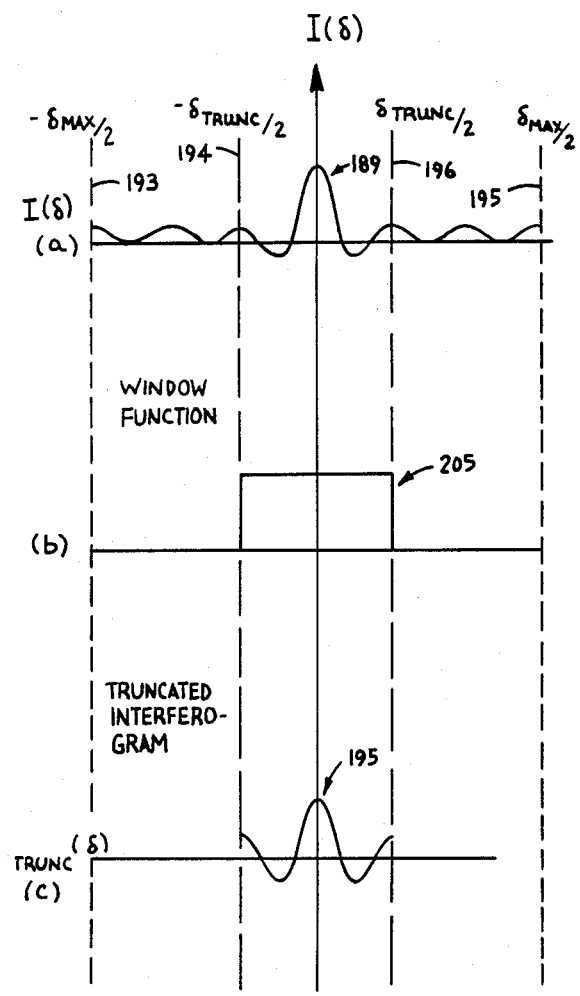
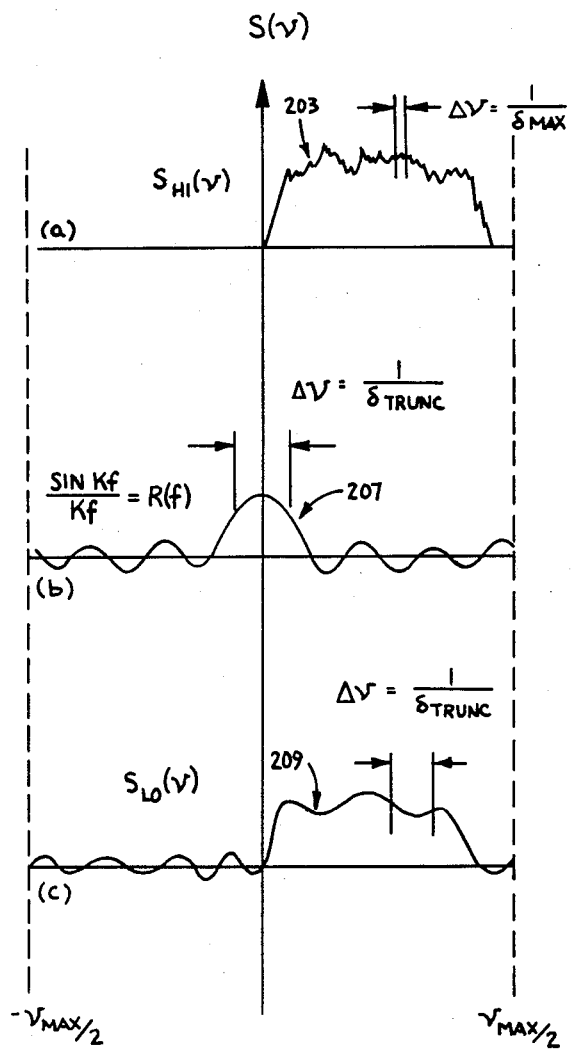
$I(\delta) \cdot (\text{WINDOW FUNCTION}) = I_{TRUNC}(\delta)$
$S_{HI}(\nu) * R(f) = S_{LO}(\nu)$
THE EFFECT ON THE DECONVOLVED SPECTRUM OF TRUNCATING THE INTERFEROGRAM

A SAMPLED INTERFEROGRAM AND SPECTRUM

A SAMPLED TRUNCATED INTERFEROGRAM AND SPECTRUM

THE OPTICAL PHASE INTERPOLATOR

INTERPOLATOR WAVEFORMS

FIG. 23A
FIG. 23B
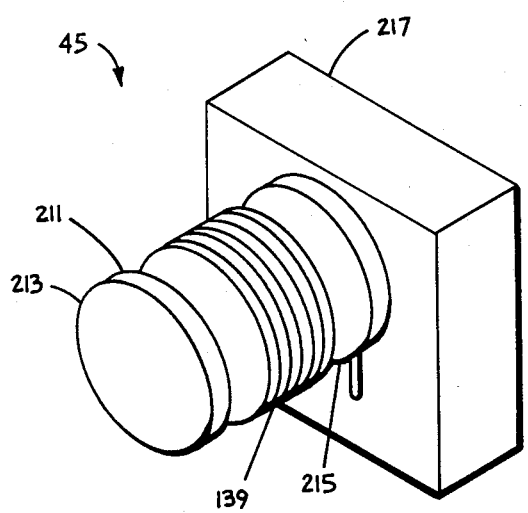
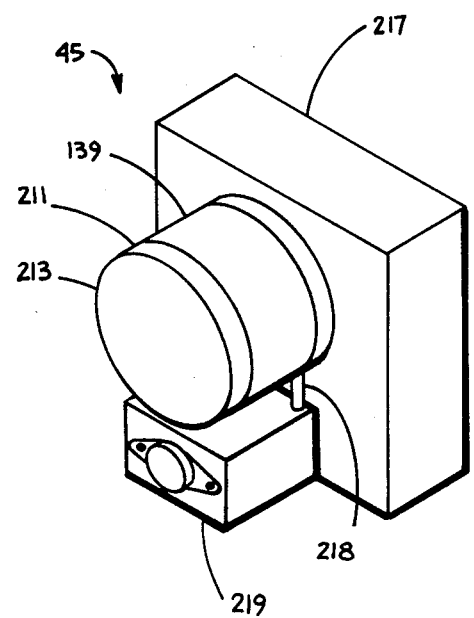
PIEZO - ELECTRIC TRANSLATION
STAGE

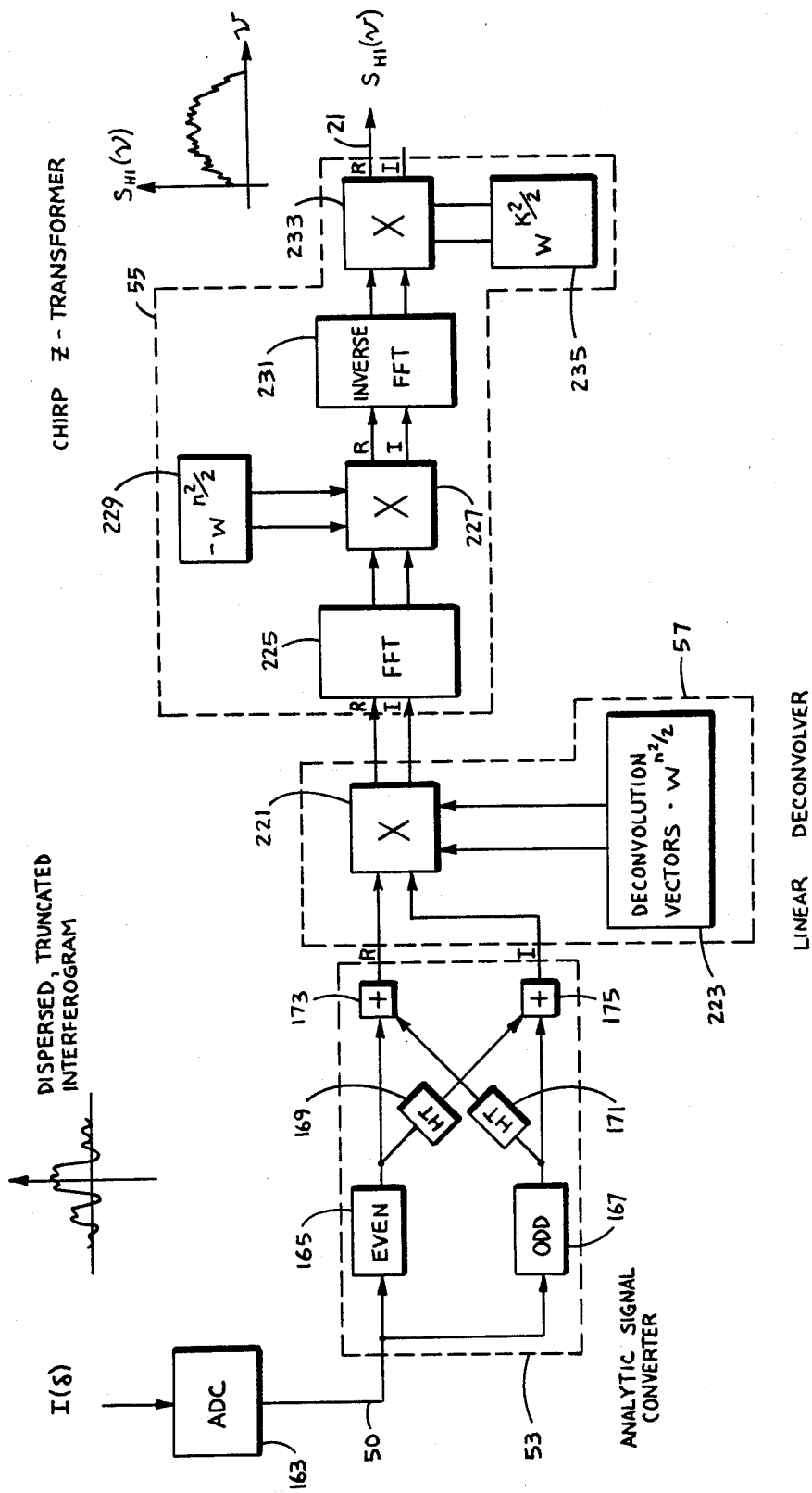
FIG. 24  A FAST SUPER-RESOLVING F.T.S.

THE ANALYTIC SIGNAL CONVERTER

TRUNCATED INTERFEROGRAM

HIGH AND LOW RESOLUTION SPECTRA

SUPER RESOLVING PARTIAL WAVE ANALYZER-TRANSCEIVER

BACKGROUND OF THE INVENTION

1. Field of the Invention

The present invention relates to methods and electronic apparatus for processing signals to produce high resolution signal information from an input signal consisting of a partial wave function. Such processing is useful, for example, in transmitting data across a transmission line at many times conventional bit rates, as in a modem network. Other applications include obtaining improved mechanical efficiencies in optical instrumentation and improved signal recording density on recording mediums.

2. Description of the Prior Art

In the signal processing art, certain advantages can be obtained by converting signals from a Z-transform state to the inverse Z-transform state, and vice versa. Moreover, some signals, such as that produced by a Michelson Interferometer spectrometer, are originated in a high resolution Z-transform state. Such a signal must be converted to a high resolution spectral signal by an inverse Z-transformer device in order to be useful or meaningful.

For example, in the Michelson Interferometer spectrometer, the usable output signal is the spectrum of individual light waves identifiable one from the other in amplitude and position along the wavenumber or wavelength axis.

As used in this specification, Z-transform is treated as the generic mathematical operation, and the discrete Fourier transform is used as a specific exemplary mathematical operation for convenience. When reference is made herein to discrete Fourier transformation, it is to be understood that the invention is not to be considered as limited to Fourier or any other type of transformation system.

When the Z-transform is truncated, a degraded data signal results, because the inverse Z-transform yields a low-resolution partial wave spectrum. The truncated Z-transform signal is thus the mathematical equivalent of a convolution of the high-resolution spectral signal and a Z-transformed window function (e.g. sync or Gaussian function). The problem to be solved then is to deconvolve these two functions (i.e. effect restoration of the degraded data signal by removing the effects of the truncating signal component) to reconstruct the desired high resolution signal. Deconvolution refers to the process of deriving an estimate of the input of a system from its output knowledge. To recover the input, it is necessary to solve a convolution equation. this is possible to do only when the system impulse response is known.

The deconvolution process to reconstruct the information signal represented by a truncated Z-transformed signal has been investigated by Remy Prost and Robert Goutte, as reported in their articles "Deconvolution When The Convolution Kernel Has No Inverse", *IEEE,* Volume ASSP-25, No. 6 (1977), Pages 542–549, and "Non-Iterative and N-Steps Iterative Support-Constrained Deconvolution Algorithmns", *Signal Processing II: Theories and Application,* Elsevier Science Publishers B.V. (North-Holland) (1983), Pages 459–498. Both of the aforementioned references are incorporated herein by reference. These references treat the restoration of degraded data involving a convolution kernel that has no inverse, i.e. the system has an impulse response whose Fourier transform has a cutoff frequency.

These prior art systems are based on the fundamental requirement that a priori information is essential in analyzing a convolution kernel that has no inverse. The earlier Prost and Goutte publication discusses an iterative deconvolution algorithm, and their later publication teaches non-iterative and N-steps deconvolution algorithms. The a priori knowledge requirement is common to all disclosed deconvolution algorithms, and is defined in the earlier Prost and Goutte publication as the knowledge of an interval which includes the support of the signal to be restored, and is a necessary and sufficient constraint required for the mathematical resolution of the deconvolution problem.

Thus, when processing a truncated (or frequency cutoff) Z-transform signal, known deconvolution methods can be incorporated to produce a reconstructed version of the signal of interest in the system, i.e. what prost and Goutte refer to as the system input.

Such prior art systems are adequate for processing continuous or purely analog versions of the truncated Z-transform signal. However, when the truncated Z-transform signal is converted to digital form for further processing, serious further system inaccuracies are introduced.

The ordinary system clock available to digitize an analog signal for further processing, if used to sample a continuous non- truncated Z-transform signal, is also used as the timing source to perform the inverse Z-transform signal, and the identical sampling rates used in the digital domain permit easy and accurate Z-transformations because of the presence of an exact sampled value occurring at each clock time. In an encoding-transmission-decoding system (e.g. modem network), the recreated clock at the receiving end, from self-clocking techniques for example, is relatively easy to produce from the digital data extant in the transmission channel. Again, a one-for-one relationship between the sampled and transmitted values of data and the derived clock precludes the loss of any transmitted information.

A formidable problem results, however, when the Z-transform signal to be digitized and transmitted is truncated. The system clock used in the digitizing process results in fewer sampling points of the Z-transform being transmitted because of the truncation. While an inverse Z-transform can be produced when the digitized (and further processed) truncated Z-transform signal is converted back to its analog equivalent at the receiver, the available number of sample points to be analog converted is the same as that sampled at the analog-to-digital converter. As a consequence, the envelope of the recovered analog equivalent of the truncated Z-transform signal is devoid of distribution points necessary to accurately reconstruct the input signal by the aforedescribed deconvolution techniques.

Stated another way, in a continuous and purely analog system, the high resolution deconvolution techniques depend upon the existence of accurate information in that interval of the signal to be restored between the boundaries (support) of the truncated Z-transform. Accordingly, the bounded interval must be mathematically continuous or at least must have the sufficient distribution components needed in carrying out the deconvolution algorithm. In a system operating on a Z-transform resulting from a digital to analog conversion, this would be the equivalent of using a system clock of infinite frequency (for the continuous analog) or of a frequency compatible with the resolution constraints of the deconvolver (for the "sufficient components" analogy). Clock generators of prior art systems are not capable of providing the sampling rates necessary to meet these requirements. Moreover, as will become evident later in this description, merely increasing the sampling rate by raising the frequency of the sampling clock is not the total solution to the problem, because limited bandwidth devices and transmission channels place practical constraints on sampling rate. Without frequency coherence and (in a transmit/receive system) without accurate recreation of a high frequency sampling clock from the transmitted data, a distorted and noisy inverse Z-transform will result, and deconvolution will yield an inadequate or useless system output signal.

Accordingly, there is a need in the art for a signal processing system that will permit retrieval of a high resolution output from the deconvolution of the inverse transform, in the digital domain, of a truncated Z-transform signal, with output signal resolution comparable to non-truncated, purely analog systems. The super resolving partial wave signal processing system of the present invention satisfies that need.

To illustrate the need in the art for such a system, this specification supports two practical examples incorporating principles of the invention; a super-resolving digital modulator/demodulator (modem), and a super-resolving Fourier transform spectrometer.

In the modem example, the present invention relates to electronic apparatus for transmitting and receiving digital data over a signal transmission channel. Since the telephone lines used for transmitting modem information are in fact bandwidth limited analog signal channels, the modem transmission channel will be referred to herein as an analog signal channel, although the data to be transmitted in a typical modem network is carried in the alterations of a carrier signal, thereby taking on a digital nature.

The familiar dial-up modem which connects a personal computer to the telephone system allows the computer to transmit and receive relatively low data rate information to and from other units equipped with modems, thereby forming a modem network. Modems capable of relatively higher data rates are used to connect large mainframe computers through microwave and satellite links. High data rate modems are also used to transmit and receive digitized speech and facsimile information over special-purpose leased telephone lines. These are only a few of an extremely large number of applications for modem-type devices.

Present-day modems typically use frequency or phase modulation of a fixed-frequency carrier signal. This is a simple technique producing a modulated signal bandwidth in hertz approximately equal to the number of bits transmitted per second (quadriphase modulation).

Dial-up modems typically use this method to achieve data rate of up to about 2400 bits/sec over standard telephone lines.

Although adequate for many applications, this data rate capability is unacceptably low for applications such as digitized voice, facsimile, and other high density data transmission applications. For example, for a 1k×1k bi-tone image, one million bits must be transmitted, taking about seven minutes at 2400 b/s. Almost all communications systems using analog channels would greatly benefit by the use of a modem able to transmit and receive at higher bit rates over existing channels. The super-resolving Z-transform signal processing system of the present invention satisfies this need.

As related to Fourier transform spectrometers, the super-resolving Z-transform signal processing system of the present invention relates to electro-optical apparatus for obtaining the optical spectrum of infrared or visible light.

Analysis of optical spectra is necessary in a variety of applications. For example, in order to determine the composition of a chemical sample, infrared light from a glowing wire is focused onto the sample, and its transmission spectrum is measured. The transmitted infrared spectrum constitutes a complex electronic "fingerprint" and is determined by the various molecular absorption characteristics of various organic and inorganic compounds in the sample. The infrared spectrum of light radiated from various objects can likewise be used to determine the chemical constituents of the irradiating source (cf emission spectroscopy). Visible and infrared spectroscopy has contributed to many discoveries in the field of organic chemistry, astronomy, plasma physics, and other sciences.

Optical spectra can be obtained by known methods using simple means such as gratings or prisms (cf dispersive spectrometers), but such methods are not very sensitive, and are extremely time consuming. A major advance in this art was the introduction of the Fourier transform spectrometer (FTS) which essentially consists of a Michelson interferometer whose output signal (the interferogram) when mathematically transformed, by inverse Fourier transformation, constitutes the optical spectrum. The FTS has two principal advantages over grating instruments:

(a) All frequencies are analyzed simultaneously, so the optical spectrum is obtained very quickly (Fellget's advantage); and (b) The entire optical aperture is used, not just a slit, so the FTS is more sensitive (Jacquinot's advantage).

The Fourier transform infrared (FTIR) spectrometer has been developed into several commercial instruments, and represents an important tool for modern physicists and chemists.

For their advantages, Fourier transform spectrometers have one principal disadvantage which results in their being bulky, delicate, and expensive. This disadvantage lies in the fundamental fact that the optical resolution is inversely proportional to the distance that a mirror is moved in one arm of the interferometer. Therefore, in order to obtain a typical 1 wave number (inverse centimeter) spectrum, the mirror must be moved about 1 centimeter. in order to achieve acceptable optical signal-to-noise ratios, the mirror must not tilt appreciably (to the order of an optical wavelength, about 1 micrometer) over the translational movement of 1 centimeter. Furthermore, the mirror motion must be approximately linear with time. In order to achieve these three requirements, expensive machine parts, air bearings, and complex electronic servo-mechanisms must be employed. Such components are delicate, expensive, bulky, and difficult to keep aligned. Present units work reliably only in the laboratory, are not portable, and will not operate in any position except horizontally.

It is therefore clear that there is a need in the art for an electro-optical servo-mechanism which when used with a Michelson interferometer requires only a small amount of mechanical movement of the operative element (about 100 times less than present instruments). The super-resolving partial wave signal processing system of the present invention fulfills this need in the art.

SUMMARY OF THE INVENTION

The present invention satisfies the needs set forth above in connection with the two examples to be described hereinafter in greater detail. Furthermore, the invention overcomes all of the disadvantages also described above with reference to the two implementation examples (modem and spectrometer).

Note should be made of the fact that the present invention is not limited to the fields of modems and spectrometers, and that these two examples will serve to typify the characteristics and features of the invention. Obviously, it can be appreciated that the fields of modems and spectrometers are quite distinct, thereby evidencing the broad application for the basic concepts of the present invention. For example, in the telecommunication field, in addition to fast dial-up modem applications, the invention can be beneficially applied in the fields of secure phones, super-fast local area networks, super-fast facsimile transmission systems, and represents a significant step toward designing a fast modem on a single integrated circuit chip.

Likewise, in the area of instrumentation, in addition to the super-resolving Fourier transform spectrometer exemplified in this description, the invention is well suited for solid state portable spectrometers (due to the reduced bulk relative to prior art devices), inexpensive spectrum analyzers (due to the small size, stability, easy alignment, etc., and super-resolving optical lithography instruments for semiconductor manufacture.

In the audio-video environment, and due to the retrievability of high resolution signals from a band limited medium, the invention can provide several orders of magnitude improvement in the signal quality of digital audio programs recorded on existing mediums of vinyl or tape, of super-high fidelity broadcasting, and of video local area networking.

As applied to the computer field, use of the invention can provide for extremely high density magnetic tape storage, and super-density optical and magnetic disc drives. With the magnitude of density increase in magnetic discs, it is foreseen that even smaller discs than are presently available on the market can become standard in the industry without sacrificing storage capacity, and in fact, in most cases, realizing a concomitant increase in capacity. Such storage density on magnetic media is seen to approach that associated only with optical storage media especially when considering other advances such as vertical magnetism recording techniques.

For military applications, the invention is useful in super-secure telephone systems and would significantly improve the resolution and/or speed of image encoders.

As will be appreciated, the present invention concerns a very fundamental signal processing phenomenon that would have great appeal in the technical arts and virtually unlimited fields of application.

According to the invention, there is provided methods and means for processing signals to produce high resolution signal information from an input signal consisting of partial wave function.

In this description, the phrase "partial wave function" refers to the summation of terms of a truncated Z-transform signal. If the Z-transform signal is truncated (bounded), then the equivalent decomposed series of wavefunctions are likewise truncated such that, at least the fundamental wave component will be less than a complete cycle, thereby rendering the signal a "partial" wave function. Thus, in this description, the truncated Z-transform signal may be used interchangeably with the term "partial wave function". In the same manner, a partial wave generator may be considered that element which creates the truncated Z-transform, and the partial wave detector then becomes the element that restores the truncated (otherwise low resolution system output) to a high resolution system output.

More particularly, the invention comprises a partial wave generator producing the partial wave function, and a partial wave detector operating on the partial wave function to produce the high resolution output. In this description, an attempt is made to separate the fields of application for the invention into two major categories, an "analyzer" and a "trans-receive system" strictly as a matter of convenience in describing the operation of the invention. In the analyzer category, the partial wave generator is under control of a high speed clock generator, the frequency of the clock determining the sampling rate of a digitized version of the partial wave generator at its output. The trans-receive system arrangement acts upon a high resolution input signal to create the partial wave output, again under control of a high speed clock. In this case, however, the analog output of the partial wave generator is carried over a transmission channel to the partial wave detector. The signal at the receiving end of the transmission channel, in addition to being routed to an information detector, is also routed to a channel clock interpolator for providing the partial wave information detector with a high speed clock used by the partial wave detector to develop the high resolution output for the system.

As applied to the trans-receive system, then, the present invention provides a unique means of transmitting high resolution information through a limited bandwidth data transmission channel without appreciable degradation of the reconstructed high resolution information at the receiving end of the channel.

As is known, in certain signal developing systems such as a spectrometer, a transformed signal is produced as an information source. In such a case, the invention concerns applying the aforementioned methods in a spatial domain wherein high resolution information is attained with several orders of magnitude reduction in movement of delicate instrumentation.

In implementing the invention, there is provided an improved means and method for recovering relatively high-resolution information from a partial wave representation of an information signal, by synchronously selecting (sampling) portions of the signal, and linearly deconvolving the partial wave representation of the information signal to produce an equivalent of the high resolution information.

For the trans-receive system category of application, it is a principal object of the present invention to employ a superior encoding/decoding method to transmit and receive wave packets of digital data over an analog channel at rates far in excess of that of prior art devices.

Another object of the present invention in this category is to use a superior encoding/decoding method to transmit and receive data over an analog channel at much lower error rates than that possible with prior art devices.

The superior encoding/decoding technique used by the present invention is related to a method referred to in the art as super-resolution, which is the art of forming images electronically with a resolution exceeding the classical diffraction limit. Therefore, in apping this method to the analog encoding/decoding of digital data, a super-resolving digital modem is proposed, having the ability to transmit and receive data at rates exceeding the usual Shannon limit.

In the analyzer category of application, it is a principal object of the invention to provide an electrooptical servo mechanism which when used with a Michelson interferometer requires only a small amount of movement of the operative element. Another object of the present invention is to provide for the of the operative element (e.g. moving mirror) motion by means of a Piezoelectric crystal, resulting in a solid-state optical head which is smaller, more rugged, easier to align, and able to work in any position.

Still another object of the present invention is to provide a higher-quality image when an infrared sensor array is placed in the focal plane of a Michelson interferomter (cf multi-spectral imager).

Still another object of the present invention is to provide signal processing means of the aforementioned improved interferometer to obtain full optical resolution comparable to existing Fourier transform spectrometers.

In satisfying these objects, the invention constitutes a new technique in the art, namely super-resolution as applied to Fourier transform spectrometers. The present invention may then be said to be concerned with, in a preferred embodiment, a Super-Resolving Fourier Transform Spectrometer.

In both the analyzer and transreceive system categories, the sampled truncated Z-transform signal is subjected to an analytic signal converter means to convert it to a digital, non-dispersed, (complex) analytic signal.

Likewise, both categories of application for the invention include, following the analytic signal converter, an inverse Z-transformer, followed by a linear deconvolver. The output of the deconvolver is the desired high resolution system output.

BRIEF DESCRIPTION OF THE DRAWINGS

The invention will now be described with reference to the accompanying drawings in which:

FIG. 1A is a block diagram of the basic trans-receive system according to the present invention;

FIG. 1B is a block diagram of the analyzer embodiment of the present invention;

FIG. 2A shows the trans-receive system in more detail;

FIG. 2B shows the analyzer embodiment of the invention in more detail;

FIG. 3 shows a preferred embodiment, more detailed than FIGS. 1A and 2A, of the trans-receive system representing a modem network;

FIG. 4 shows a more detailed diagram than FIGS. 1B and 2B of an analyzer represented by the example of a spectrometer;

FIG. 6 is a detailed block diagram of a super-resolving digital modem;

FIG. 12 is a detailed block diagram of the analyzer embodiment of the invention illustrating a complete super-resolving Fourier transform spectrometer;

FIG. 13 shows the basic complements of a moving mirror Michelson interferometer according to the prior art;

FIG. 14 illustrates an alternate configuration of a Michelson interferometer according to the prior art;

FIG. 15 illustrates the interferogram and its Fourier transform;

FIG. 18 illustrates the decomposition of a truncated interferogram into non-othogonal functions (partial waves);

FIGS. 19A and B illustrates the effect on the deconvolved spectrum of truncating the interferogram;

FIG. 23 shows the construction of a piezoelectric stage for effecting the mirror movement in the spectrometer arrangement shown in FIG. 12;

FIG. 24 shows an alternate and preferred arrangement of the linear deconvolver and inverse Z-transformer representing a fast super-resolving version of the equivalent components of FIG. 12;

DETAILED DESCRIPTION OF THE PREFERRED EMBODIMENTS

Figure 5:
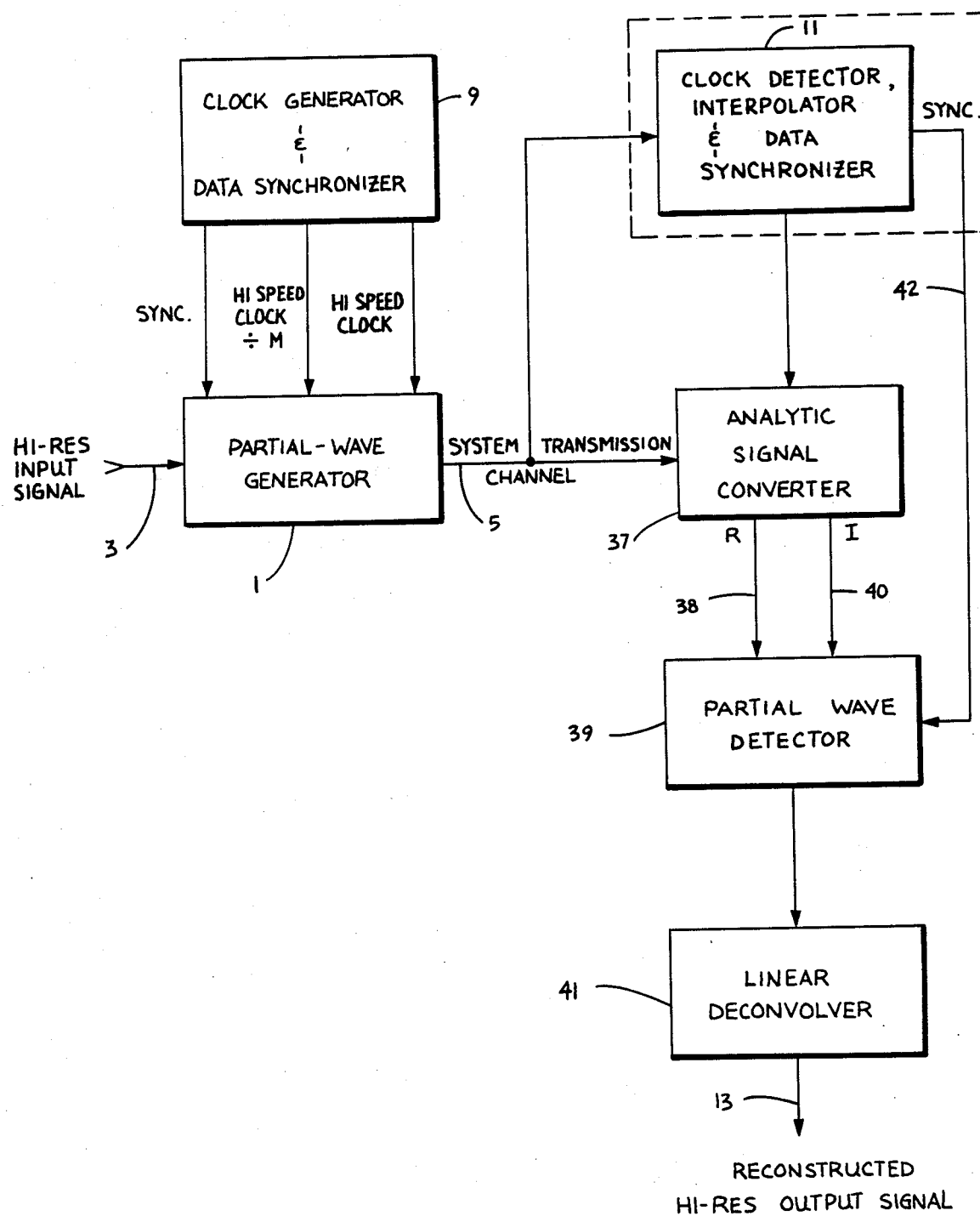
FIG. 5 is an alternately presented version of the trans-receive system embodiment of the invention.

The invention will now be described in more detail, first in rather general terms describing a trans-receive system application and an analyzer application, and then more specifically to the implementation of the invention in a modem network (trans-receive system) and then as applied to the processing of signal information developed in a Michelson interferometer spectrometer (analyzer).

FIG. 1 shows the basic blocks of a trans-receive system employing the invention. Here, a partial wave generator 1 produces a partial wave function, and a partial wave detector 7 operates on the partial wave function to produce the desired high resolution output. The high resolution input signal 3 represents an analog or digital signal desired to be transmitted through a band limited transmission channel 5 and produce a replica of the high-resolution signal at the output 13. The partial wave generator 1 acts upon the input signal 3 to create the partial wave output, under control of a channel clock generator 9. Clock generator 9 provides timing information for creating the partial wave transformation of the input signal and for sampling the partial wave function at a fast clock rate for transmission in the sampled form along transmission channel 5. Although a transmission line is exemplified in this discussion, the invention is, of course, applicable to system transmitting information with electromagnetic waves, purely magnetic means, and photon energy.

In order to reconstruct the high resolution signal at output 13, it is necessary to provide an interpolated channel clock 11 producing a fast clock developed and synchronized by the sampling of the data transmitted over the transmission channel 5. In this description, the high resolution input signal on line 3 is referred to as the system input, while the reconstructed high resolution output on line 13 is referred to as the system output.

With reference to FIG. 1B, the "analyzer" form of the invention is illustrated. Although the invention is easier to described initially in the form of a trans-receive system, it is clear that the diagram of FIG. 1B represents the broadest of the invention. The arrangement of FIG. 1B maybe considered the core about which an unlimited number of systems in practically any field of application can evolve. Thus, while FIG. 1B will be used here as a basis of discussion of a spectrometer embodiment, it will also provide the support for the broadest appended claims.

In the preferred embodiment of the analyzer configuration to be described later, it will be observed that the interferogram output from a spectrometer is already in a Z-transformed state, such that the "system input", is, in fact, an optical spectrum. The inverse transform of the interferogram, however, is the equivalent of a system input, and it is this equivalent spectral distribution that is what is meant by "system input" in describing the analyzer configuration.

In this connection, FIG. 1B shows a partial wave generator 15, again under the control of a clock generator 17 for producing high-frequency samplings of the partial wave function. Partial wave detector 19 then recreates the "system input" information at its output 21. Since there is no transmission channel in the analyzer configuration, there is no necessity for generating an interpolated clock for the partial wave detector 19. That is, the signal input to partial wave detector 19 is the equivalent of the signal sampled by the interpolated clock 11 within partial wave detector 7 of the trans-receive system shown in FIG. 1A.

FIG. 2A breaks the trans-receive configuration into smaller functional blocks than that of FIG. 1A. In FIG. 2A, the channel clock generator 9 is shown to have a reference frequency input 59 and a sync input 33. The reference frequency input 59 is preferably from a crystal controlled oscillator output and may be multiplied within clock generator 9 to any desirable multiple frequency of that crystal oscillator source (not shown). The sync input on line 33 is of a relatively lower frequency and causes the output from clock generator 9 to shift its frequency periodically. In this way, the information transmitted down transmission channel 5 will carry the sync information as occasional pulsed frequency shifts, and this sync information will be filtered out from the received signal and used to synchronize the detector with the wave packets at the receiving end. The sync signal also provides the timing to define frames of Z-transformed input ($b_k$) resulting in the transmission of wave packets along the transmission channel 5.

System input is shown here as $b_k$ on line 3 representing a bit stream input to partial wave generator 1. Frames of the system input are transformed by partial wave generator 1 to wave packets and are transmitted along transmission channel 5 as sampled partial wave functions. The wave packets arrive at the receiving end at both sampler 35 and phase locked loop 11. The function of the phase locked loop 11 is to produce, from the transmitted wave packet information, a sync signal and a fast clock having a relationship to the transmitted information the same as did the sync and fast clock at the transmitting end of the transmission channel 5. The fast clock is used in sampler 35 which sends the sampled information to partial wave detector and deconvolver 39, 41, while the sync information from phase locked loop 11 is used by the partial wave detector and deconvolver 39, 41 to identify the separate wave packets for processing. Output 13 is then the bit stream reconstructed to match that of the system input on line 3.

The operation of the analyzer diagram of FIG. 2B can be understood from the discussion in connection with FIG. 2A. The only differences are that, in FIG. 2B there is no transmission channel, partial wave generator 136 produces a truncated interferogram, the effective system signal is the wavenumber spectrum $S(\nu)$, and an interpolated laser fringe clock is generated by PLL 17(b) instead of a fast clock derived from the transmitted data in the case of the trans-receive system.

The channel clock generator 9 is comprised of a frequency multiplying VCO (voltage controlled oscillator) 8 having a reference frequency $f_r$ and a sync input from sync generator 33 as previously described. The output of VCO is a high speed clock herein referred to as a "fast clock". The fast clock is divided by a fixed number M in divider 29 the output of which is added to the information to be transmitted down the transmission channel 5 and will aid in developing the fast clock at the receiving end.

A Z-transformer 23 receives the bit stream system input signal on line 3 and performs a Z-transformation of that input signal. Sync generator 33 provides a sync signal into the Z-transformer 23 to create a sequential series of frames of transformed data. The sequential transformed frames of data are then applied to truncation device 25 which establishes upper and lower boundaries for the frequency spread of the Z-transformed data from transformer 23. The output of the truncation (apodization) device 25 is then a sequential series of partial wave packets, the partial wave character being a consequence of the truncation of the Z-transformed data.

Accordingly, the output of truncation device 25 comprises a number N of Z-transformed binary digits occurring in one frame time and encoded as N partial waves, where a frame time is defined as the period of the partial wave packet. The fast clock divided by M from divider 29 has been summed with the truncated and transformed input signal in adder 27 in order that the transmitted data will contain information as to the timing and pulse recurrence rate of the partial wave packets.

The partial wave packets are then routed to waveform sampler 31 which samples the output from adder 27 at a high rate under control of the fast clock from VCO 8. The data transmitted over transmission channel 5 is then the high speed sampled waveform from adder 27.

At the receiving end of transmission channel 5, a waveform sampler receives the transmitted information and produces a signal the same as that outputted from adder 27 at the sending end of the channel. However, in order to faithfully produce the transmitted information at the high sampling rate used in the transmitter, a frequency higher than the highest frequency transmitted through the channel must be developed. This is accomplished by sensing a portion of the data on transmission channel 5 by the frequency multiplying phase locked loop (PLL) 11. PLL 11 creates a high frequency clock from its own internal source and is kept synchronized with the data transmitted responsive to the clock information inserted into the data channel by divider 29 at the transmitting end. Thus, PLL 11 outputs a fast clock from the high frequency clock generator within block 11 and a low frequency sync pulse for redefining the timing and period of the aforementioned frame time or partial wave packet. The fast clock from PLL 11 is, by the sensing of the data in transmission channel 5, at the same frequency and synchronized with the received information in the same relationship as the same parameters in the transmit portion of the system. More specifically, the frequency multiplying PLL 11 through detection and interpolation functions, effectively provides a sampling clock at the receiver which is synchronized with and a multiple of a detected reference clock which has been transmitted over the channel.

Analytic signal converter 37 then converts the real analog signal which has possibly been subjected to electrical dispersion in the analog channel to a digital, non-dispersed analytic signal. An analytic signal is hereby defined as a complex waveform whose real and imaginary parts form a Hilbert transform pair. By converting the partial wave information to an analytic signal before doing the inverse transformation, the real magnitude distribution points are realized upon transforming, and in addition the distribution points are zero-filled by a factor of two. This fact will be useful in the later discussion of the operation of fast deconvolution which requires fast Z-transformations to be performed.

The analytic signal, then, from analytic signal converter 37 undergoes an inverse Z-transformation by inverse Z-transformer 39 under control of the sync timing from PLL 11.

The inverse Z-transformed signal, still containing the effects of the truncation device 25 at the transmitter, is deconvolved in deconvolver 41 to remove the truncation component and faithfully reproduce the original system input signal at the deconvolver output on line 13. By removing the effects of the truncation in deconvolver 41, a high resolution system output is developed in spite of the relatively small bandwidth limitations of the transmission channel. The key to being able to retrieve high resolution information lies in the fast clock applied to waveform sampler 35 to extract the same data that was encoded by the fast clock in the waveform sampler 31 of the transmitter. This unexpected result can be appreciated from the fact that it was not necessary to send the fast clock over the transmission channel, but rather it is only necessary to produce an interpolated fast clock at the receiver at the same frequency as the transmitter clock and synchronism with the transmitted data.

Turning now to FIG. 4, a similar diagram as that discussed with the previous figure is shown concerning the specific embodiment of a spectrometer for the analyzer configuration. In the spectrometer, a moving mirror 45 is normally moved in one arm of a Michelson interferometer to produce the interferogram output. The smaller the limits of mirror movement, the lesser the information contained in the interferogram. The limits of mirror movement in the spectrometer are shown schematically at 47 in FIG. 4.

In order to effect high speed sampling of the interferogram on line 48 by waveform sampler 49, again a high speed or fast clock must be developed. In the spectrometer arrangement of FIG. 4, a laser 51 is shown having its light output routed to both the spectrometer optics 43 and an electro-optical phase locked loop (PLL) interpolator 17. The single frequency light output from laser 51 passes through the spectrometer and is affected by the moving mirror 45 to produce, essentially, a sine wave which has a frequency proportional to the rate of movement of the mirror (shown in greater detail in FIG. 12). That sine wave is used within the interpolator 17 to produce the fast clock used in the waveform sampler 49. Thus, the sampled interferogram on line 50 exhibits a sampling rate a multiple of times faster than frequency components produced in the spectrometer output (by a factor of M). The partial wave detector 19 with its analytic signal converter 53, inverse Z-transformer 55, and deconvolver 57 components operate in the same manner as that described in connection with the corresponding elements of FIG. 3.

In FIG. 5, a variation of the trans-received system of FIG. 2A as shown. In FIG. 5, the blocks are labeled slightly differently in order to aid in the clearer understanding of a more detailed block diagram to follow. Clock generator and data synchronizer 9 outputs three signals, a sync signal for defining the frame periods, a fast clock for high speed sampling of the data to be transmitted over the system transmission channel 5, and a fast clock divided by M which is added to the data on the transmission line and used at the receiver for producing the interpolated fast clock at the receiver end.

The PLL 11 of FIG. 2A is shown in FIG. 5A as a clock detector, interpolator, and data synchronizer 11. Its function is to retrieve the clock information from the transmitted data, produce a fast clock via an interpolation process, and isolate the sync signal on line 42 for use in the partial wave detector 39, i.e. in the inverse Z-transformation of the transmitted signal. Analytic signal converter 37 shows a real part outputted on line 38, and an imaginary part outputted on line 40. Both real and imaginary parts are needed for accurate inverse Z-transformation with a high signal-to-noise ratio. This will be discussed in further detail later in this description. The remaining blocks and signal routing shown in FIG. 5 may be analyzed in the same manner as described above.

PREFERRED EMBODIMENT OF A SUPER-RESOLVING DIGITAL MODEM NETWORK

The blocks shown in dashed lines in FIG. 6 correspond to the solid blocks in FIG. 5, previously described. The function and/or breakdown of each dashed block in FIG. 6 will now be described with reference to the series of drawings of FIGS. 7–12.

A binary bit stream of data is inputted to the system on line 3 and identified as the system input signal $b_k$.

It will be realized that the object of the partial wave generator 1 is to ultimately transmit a serial sequence of frames of truncated Z-transformed signals down the transmission channel 5. In order to do this, the partial wave generator 1 must perform a Z-transform on the input signal, truncate the transformed signal, encode a reference clock along with the truncated Z-transformed signal, and sample the result with a fast clock. The high speed sampled signal is then ready for transmission down the transmission channel 5.

Figure 25A:
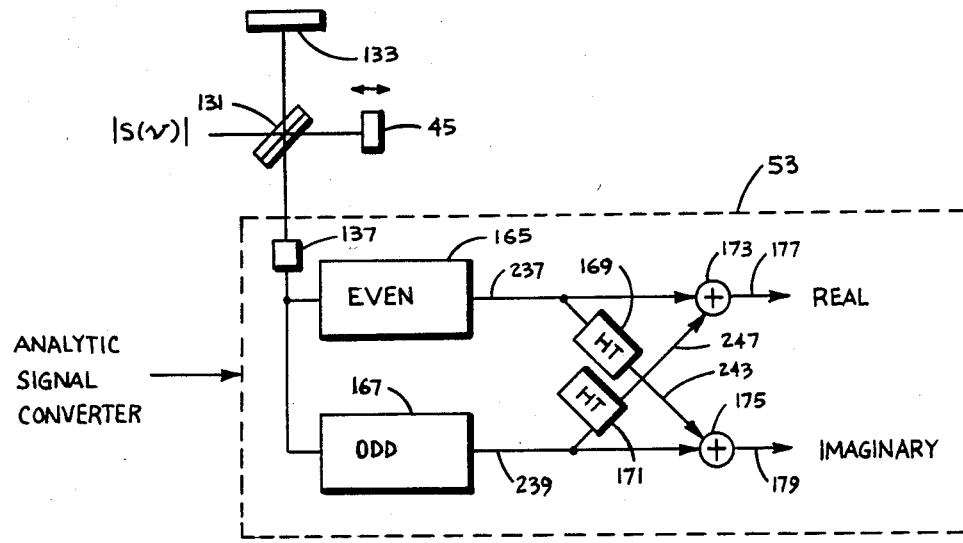
FIGS. 25A and B illustrate, respectively the block diagram arrangement and signal waveforms of the analytic signal converter used with the present invention.

The Z-transformer 23 is a known functional block which receives the output from a sync generator 33 as a synchronizing signal. Accordingly, the output of Z-transformer 23 is a series of Z-transforms each transform being confined within a time frame $t_f$ (FIG. 7B) determined by the pulse recurrence frequency of the sync generator 33. Z-transformer 23 outputs a real and imaginary part, but only the real part is necessary to be transmitted, as will be explained later in the discussion of Hilbert transform pairs (FIG. 25A). The real part of the transformed input signal is multiplied by the truncating function e(t) from block 25 at the multiplier 61.

To this point, all signals have been processed in the digital format, necessitating the digital-to-analog converter 63 whose analog output is summed in summing amp 27 with a timing reference from divider 27. Divider 27 receives the fast clock from VCO 8 and divides the frequency by a factor M to produce the reference frequency for adding to the truncated Z-transformed signal in summing amp 27. The non-divided fast clock from VCO 8 is sent to sampler 31 which outputs sampled levels of its input at the fast clock rate. The rectangular part of block 31 can be considered the signal sampler, while the triangular part of block 31 may be considered a low pass filter to remove any high frequency components of the fast clock entering the transmission channel 5.

The VCO 8 is kept at a constant frequency by the supply of a highly accurate frequency $f_r$ from stabilized crystal controlled oscillator 59. In effect, VCO 8 is a frequency multiplying voltage controlled oscillator which outputs the fast clock necessary for high speed sampling in sampler 31, but is locked to the lower frequency ($f_r$) highly stabilized frequency source. Being sensitive to voltage at its input for setting the frequency at its output; VCO 8 receives a voltage pulse from sync generator 33 at the sync rate, and this pulse is used by the system to cause the oscillator output from VCO 8 to temporarily shift its frequency for a short duration relative to the time period of the sync signal. This short burst of altered frequency from VCO 8 is used at the receiver to recreate the sync pulse timing necessary for the inverse Z-transformation at the partial wave detector 7. The divide-by M circuit 27 introduces a submultiple of the fast clock into the data stream from D/A converter 63 in order to multiplex a reference clock on the transmission channel 5. This reference clock will be used at the receiving end, in an interpolated form, as the sampling clock for extracting information from the sampled data at precisely the right frequency and phase. In the modem arrangement exemplified here, the channel clock is multiplexed with the channel data. In some applications, it may be advantageous to transmit the clock and data over different signal lines or channels, and such an arrangement is within the scope of the applied invention.

At the receiving end of the transmission channel 5, the received signal is routed to the sampler 35 as well as to a multiplier 93 in the clock detector, interpolater, and frame synchronizer 11. Block 11, is in effect, a phase locked loop comprising a VCO 85 and servo loop components: divide-by M circuit 91, multiplier 93, and amplifer/low pass filter 95.

In operation, the phase locked loop 11 operates in the following manner. VCO 85 is designed to operate within a narrow range of the predetermined frequency of the fast clock used at the encoding (transmitting) end of the transmission channel 5 as determined by a reference frequency $f_{r1}$ oscillator 87. Its output is divided by M and sent to multiplier 93. Multiplier 93 is, in essence, a frequency comparator which compares the VCO 85 output divided by M with the extracted reference clock in the transmission channel 5. Depending upon whether the channel clock is lower or higher than the divide-by M output, a plus or minus voltage is generated by amplifer/low pass filter 95 which forces, via VCO 85, the divided-by M circuit 91 output to track the received channel clock extracted from line 5. When the channel clock frequency is shifted discontinuously at sync times, a pulse is developed at the output of filter 95 which serves to synchronize the inverse Z-transformer 39. The result of the phase lock loop operation just described not only produces the fast clock for extracting the data in sampler 35 in synchronous relationship to the transmitted data, but the sync signal produced on line 89 for phase locking VCO 85 is the same sync signal necessary for the inverse Z-transformer 39 to place the input data it sees in the center of its memory device. The inverse Z-transformer 39, like Z-transformer 23, is an off-the-shelf component and need not be described herein in detail.

The desampled signal from sampler 35, being a recovered series of frames of truncated Z-transforms in the analog domain, is converted to the digital domain by analog-to-digital converter 67. The analytic signal converter 37 will be described in detail later and is shown here in its major component parts of the even detector 69, odd detector 71, Hilbert transform devices 73 and 75, and summing amplifiers 77 and 79. The analytic converter removes all effects of dispersion in the channel including a simple translation in time of the wave packets. This ability of the analytic signal converter to remove the requirement of a phase coherent clock allows the use of the phase locked frequency multiplier whose output is not guaranteed to be phase coherent. In this connection, reference is made to Spread Spectrum Systems, R. C. Dixon, published by Wiley & Sons, 1976, Page 151, Pages 150–154 thereof being incorporated herein by reference. The analytic signal converter develops both the real and imaginary parts of the received signal, even though only the real part was transmitted. Both real and imaginary parts are used by the inverse Z-transformer 39 in a conventional manner. Note should be made of the fact that, in the illustrated digital modem of FIG. 6, the inverse Z-transformer 39 and deconvolver 41 constitute the partial wave detector 7 of earlier block diagrams.

The inverse Z-transformed signal from transformer 39 remains in the truncated form as it is routed to the linear deconvolver 41 which is designed to remove the truncation factor and restructure it to precisely the form $b_k$ which it has before processing by the partial wave generator 1 at the sending end. This is accomplished by selective multiplication of the inverse Z-transformed signal with deconvolution matrix 99. The zero crossing detector 98 operates in a conventional manner to produce the desired high resolution output $b_k$.

A more detailed analysis of the signal processing through the super-resolving digital modem system of FIG. 6 will now be given, bearing in mind that the preferred embodiment to be described employs a truncated Fourier transform technique to encode a complex N/2-length bit sequence into a sum of partial waves.

Figure 7A:
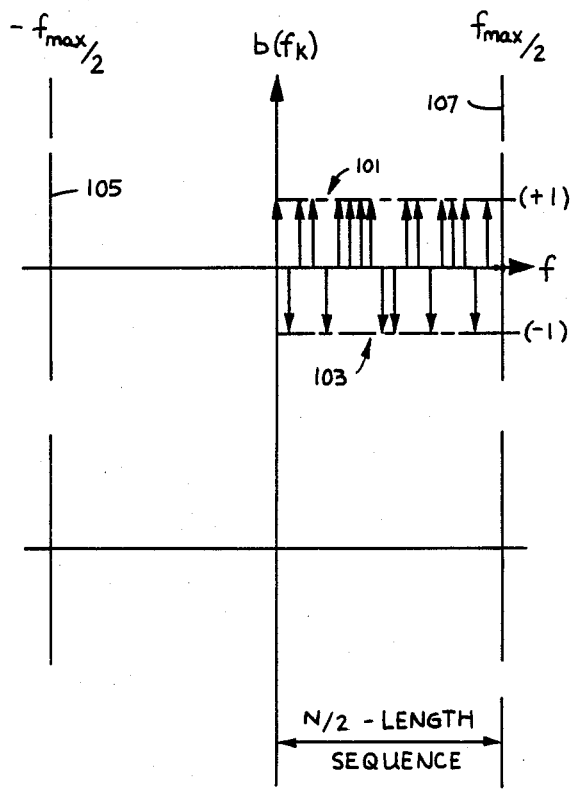
FIGS. 7A and B show the Fourier transform of a real binary sequence.

The discrete Fourier transform of a real N/2-length sequence of pulses is shown in FIG. 7A. The pulses represent the real part of a complex N/2-length bit sequence $b(f_k)$, where a binary one is considered to be a pulse 101 of height $+1$, and a binary zero to be a pulse 103 of height $-1$. The count of bits for $0 \leq f \leq f_{max}/2$ is the maximum number of bits per frame that can be transmitted within the available bandwidth $f_{max}$ of the transmission channel.

Figure 7B:
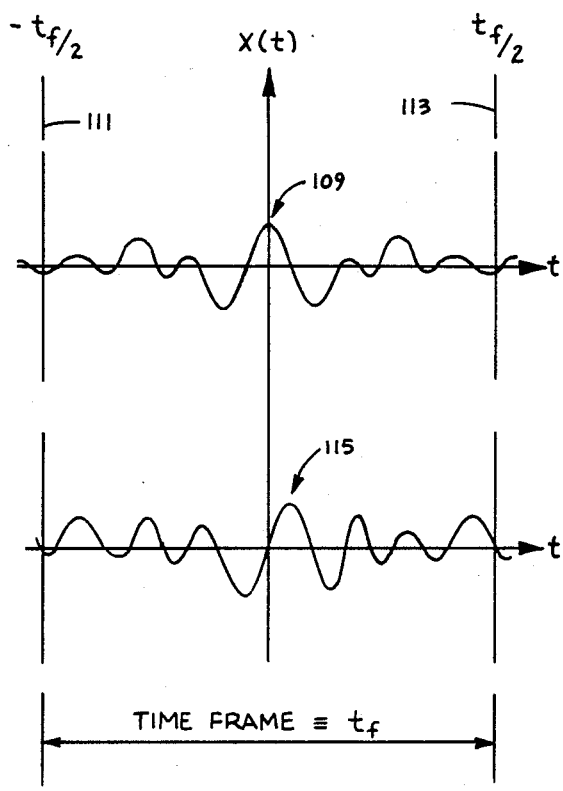

The transformed signal $X(t)$ of FIG. 7B can be considered to be the Z-transform of the signal $b(f_k)$.

$$X(t) = \sum_{k=0}^{N-1} b_k [e^{i2\pi/tf}]^{kt} = \sum_{k=0}^{N-1} b_k Z^k$$

where $Z = [e^{i2\pi/tf}]^t$ and $\phi_k(t) = Z^k$.

The signal $X(t)$ is then a sum of wave functions $\phi_k(t) = [e^{i2\pi/tf}]^{kt}$ multiplied by a $+1$ or a $-1$ according to the value of the $K^{th}$ bit in the sequence. Because the sequence $b(f_k)$ is real and causal, i.e. $b(f_k)=0$ for $-f_{max}/2 \leq f_k < 0$, the transformed signal's real and imaginary parts 109,115 form a Hilbert transform pair, and its real part 109 is purely even, and its imaginary part 115 purely odd. Accordingly, because the imaginary part 115 can be recovered from the real part at the receiver by a Hilbert transformer 90 degree phase shifter in analytic converter 37, only the real part 109 need be transmitted down the analog channel 5.

Similar arguments apply for a purely imaginary bit sequence, except that the real part of the transformed signal $X(t)$ is purely odd, and the imaginary part purely even. By superposition, then, it is clear that using this form of Z-transform (e.g. Fourier transform) a total of N bits can be encoded into a wave packet tf in length, whose maximum wave frequency is $f_{max}/2$. For example, assuming that N=256, and the maximum frequency which can be transmitted is 2500 Hz, then the period of the fundamental wave $\phi_1$ is (1/2500S) (N/2)=51.2 milliseconds. This can be seen to be the length of the time frame tf by noting that $\phi_1 = [e^{i2\pi/tf}]^t = e^{i2\pi(1/tf)t}$, i.e. the fundamental wave has a freqeuncy 1/tf, or period tf.

Therefore, a total of 256 bits can be transmitted every 51.2 ms resulting in an effective data rate of 51.2/256=0.2ms/bit or 5000 bits/sec.

The aforementioned wave functions $\phi_k(t) = [e^{i2\pi/tf}]^{kt}$ are orthogonal over the interval $-tf/2 \leq t \leq tf/2$, i.e., $$1/tf \int_{-tf/2}^{tf/2} \phi_j \phi_k = \delta_{jk}$$

where
$\delta_{jk}=1$ if $j=k$, and
$\delta_{jk}=0$ elsewhere.

Figure 8:
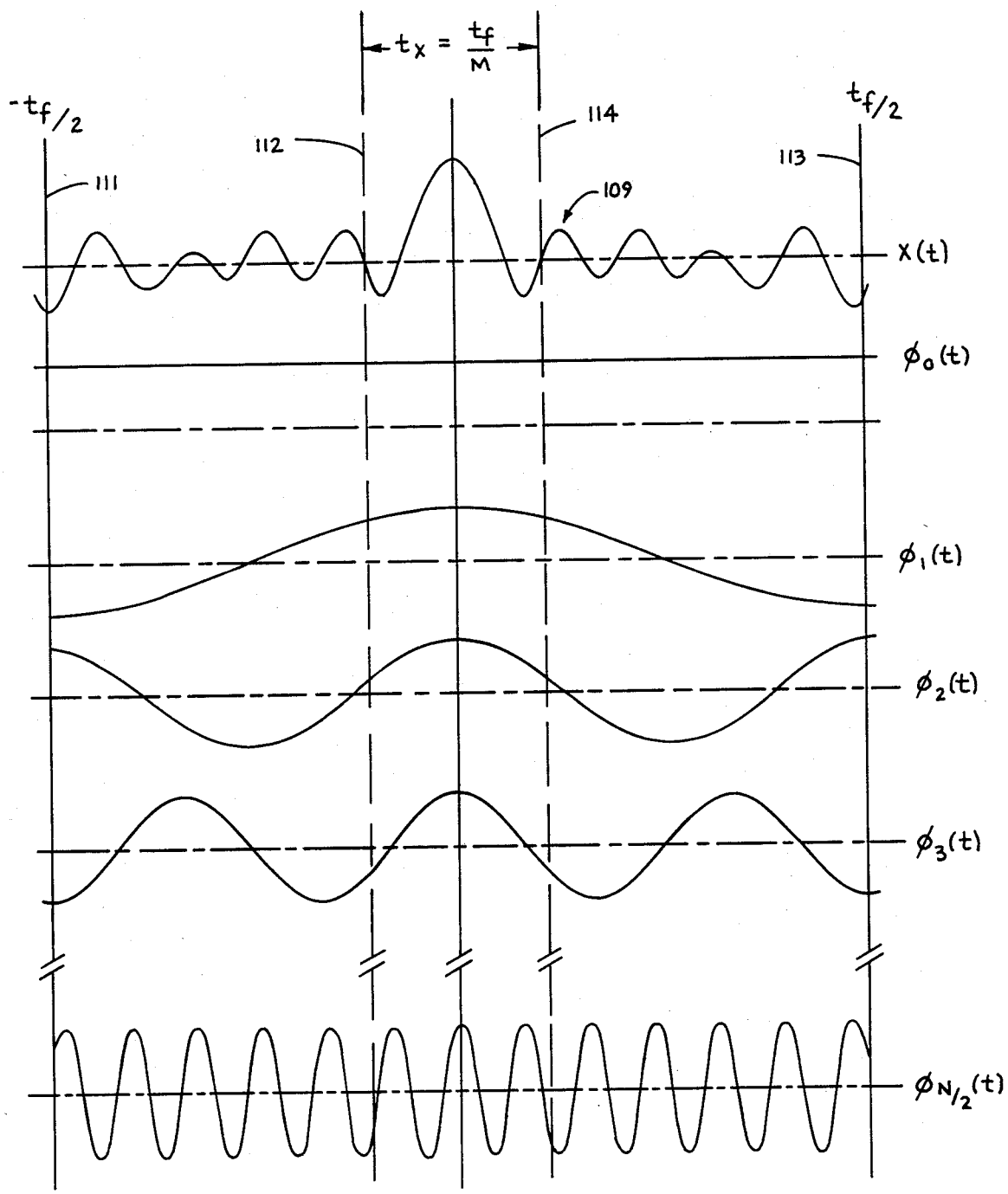
FIG. 8 shows the decomposition of a Fourier transform into orthogonal waves.

The decomposition of the real part of $X(t)$ into orthogonal waves is shown in FIG. 8. That is, $$X(t) = \sum_{K=0}^{N-1} b_k \phi_k(t).$$

Because the wave functions $\phi_k(t)$ are orthogonal, the bit sequence $b_k$ can be recovered easily at the receiver by using a known inverse discrete Fourier transform technique i.e.

$$b_k = \sum_{n=0}^{N-1} X(t_n)[e^{-i2\pi/N}]^{nk}$$

where $X(t_n)$ is the sampled signal at the receiver and $t_n = n\Delta t$, $\Delta t = tf/N$.

As shown, this decomposition of $X(t)$ into orthogonal waves yields a bit rate about twice the maximum channel bandwidth. In the present invention, however, the N/2-length complex bit sequence is encoded into N non-orthogonal waves (partial waves), thereby achieving much higher bit rates. This is done by truncating the wave functions $\phi_k(t)$.

With the present invention, one is able to encode and decode N bits in a time frame of only $t_x = tf/M$, where M is the data compression ratio.

Figure 9:
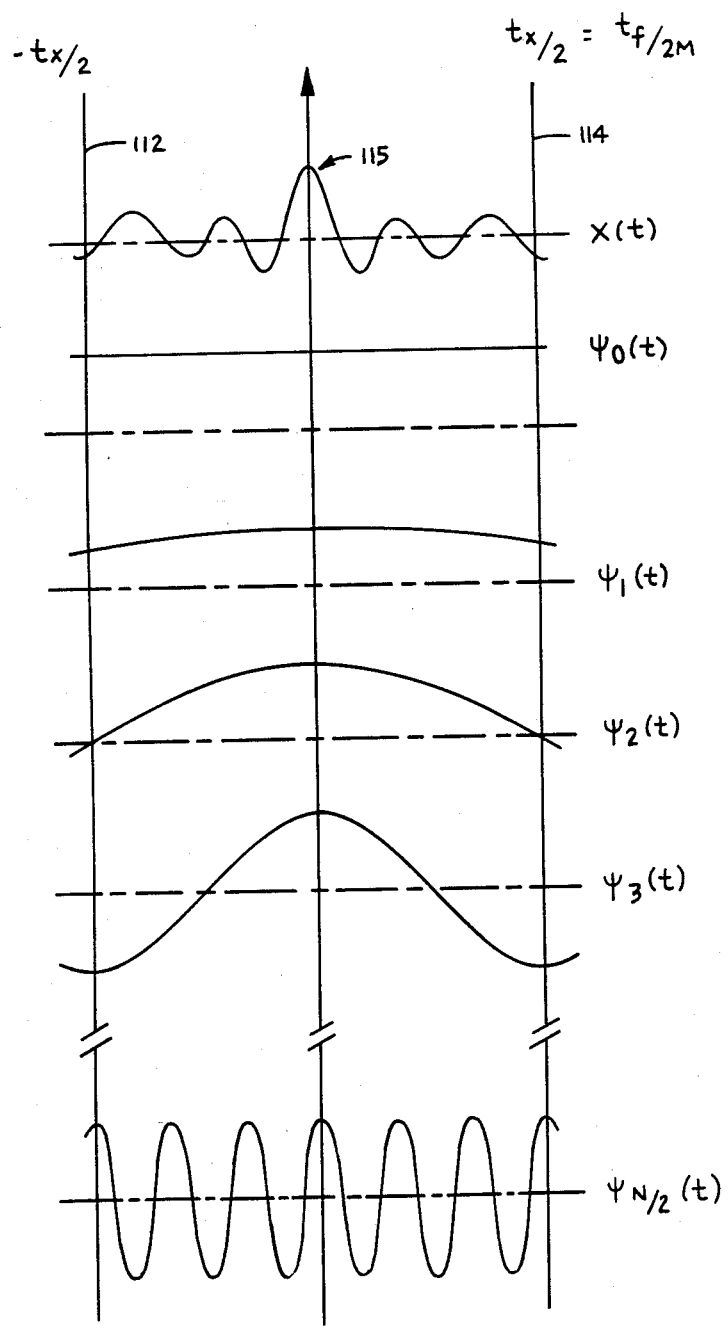
FIG. 9 shows a decomposition of a truncated Fourier transform into partial waves.

According to FIG. 9, we now have $$X(t)_{trunc} = \sum_{k=0}^{N-1} b_k[e^{i2\pi/tf \cdot M}]^{kt} = \sum_{k=0}^{N-1} b_k Z^k$$

where $Z = [e^{i2\pi/tf \cdot M}]^t$ and $\psi_k(t) = Z^k$. As before (cf FIG. 7B), the real N/2-length bit sequence $b_k$ is Z-transformed and truncated into the signal $X(t)_{trunc}$ (FIG. 10A) whose real part is shown. By similar arguments, we see that N bits can now be encoded into a time frame $t_x = tf/M$ which is M times shorter, and we are able to transmit data at M times the rate of the aforementioned Fourier transform modem. This requires, of course, the fast clock from VCO 8 of FIG. 6 to be M times faster than the transmitted reference channel clock.

Figure 10A:
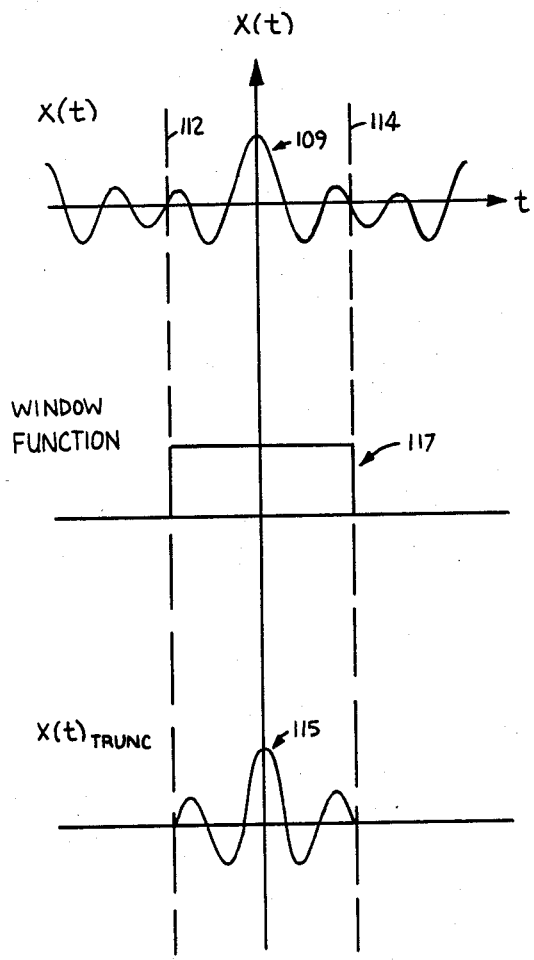
FIGS. 10A and B illustrate the convolution of a bit spectrum due to truncation of the transform of the bit spectrum.
Figure 10B:
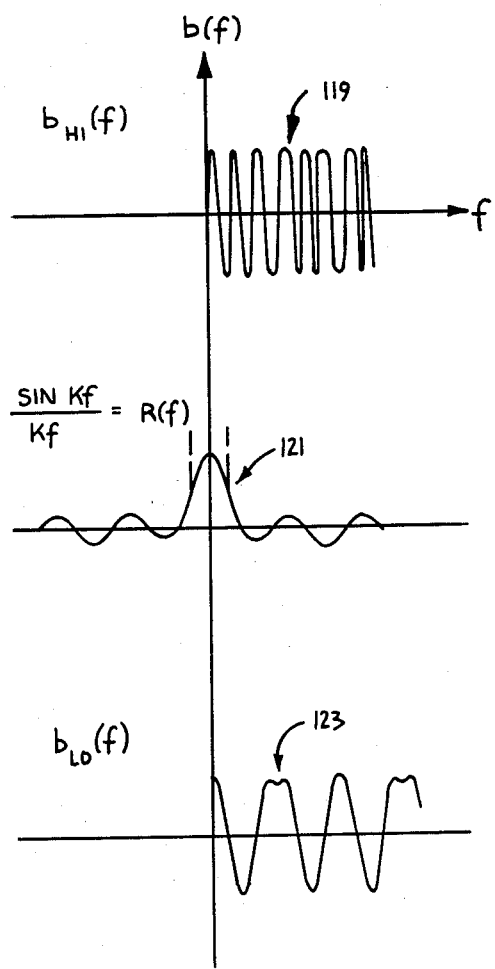

At the receiver, however, the situation is more complicated because of the non-orthogonal nature of the functions. In this case the inverse Z-transform $$b_k = \sum_{n=0}^{N-1} X(t_n)_{trunc}[e^{-i2\pi/N \cdot M}]^{nm}$$

where $t_n = n\Delta t$, $\Delta t = t_x/N = tf/N \cdot M$ yields a low-resolution partial-wave spectrum whose elements are linear combinations of the M adjacent elements. This is due to the non-orthogonal nature of the partial wave functions $\psi_k(t)$. The situation resulting from the truncation of the wave functions $\psi_k(t)$ is shown in FIGS. 10A and 10B, where $b(f) = {}^bH_i(f)$ is the Fourier transform of $X(t)$, and $b(f) = b_{Lo}(f)$ is the Fourier transform of the $X(t)_{trunc}$, and the latter is equivalent to convolving the high-resolution pulses $b_{Hi}(f)$ comprising the input bit sequence with the sync function (sin kf)/kf, resulting in the low resolution partial wave spectrum $b_{Lo}(f)$ (See FIG. 10B).

The basic problem may be stated:

$$b_{Lo}(f) = \int_T b_H(F) R(f - F) dF. \quad (1)$$

$T$ = Bounded Support

When $b_{Hi}(F)$ is band-limited, i.e. has "a priori" known bounded support (see Prost and Goutte, supra) equation becomes a first kind Fredholm integral equation, and we must solve for $b_{Hi}(F)$, and $R(f-F)$ is a non-causal impulse response function which has no inverse (i.e. it is a sync function or Gaussian).

The problem equation (1) can be solved exactly for the no-noise case by the method of Ville and Gerchberg (see Prost and Goutte, supra), and the discussion under the subtitle "N-Step Deconvolution Algorithm for Non-Causal Impulse Response Function" in the description of the Spectrometer embodiment of the invention, infra. This method involves a series of successive approximations and can be guaranteed to converge by a kernel-splitting technique. Repeated iterations lead to an infinite series which can be summed, and result in a non-iterative solution. It can be proven that for the case of no noise, this series of approximations will always converge to the exact values of the function $b_{Hi}(F)$ i.e. will retrieve exactly the high resolution bit spectrum from the transform of the truncated signal $X^{(i)}trunc$ when:

(a) N data points are taken (will converge in N steps), and (b) $R(f)<2$, always true for passive convolution.

PRACTICAL CONSIDERATIONS

The signal $X(t)_{trunc}$ contains the encoded N/2-length complex bit sequence, and is well-defined over the interval $-t_x/2 \leq t \leq t_x/2$. However, discontinuities can exist at the frame boundaries (see FIG. 11A). For example, for $M=1$, $t_x=tf$, and successive bit sequences $b^{(i)}_k$ whose second element $b^{(i)}_1$ contains ones and zeros, the discontinuities can be seen clearly. The problem is solved by multiplying $X(t)_{trunc}$ by an envelope function $e(t)$ which is zero-valued at the frame boundaries, creating a wavepacket:

$$S^{(i)}(t) = e(t) \, x^{(i)}(t)_{trunc}$$
$$= e(t) \sum_{k=0}^{N-1} b^{(i)}k [e^{i2\pi/tf \cdot M}]^{kt}$$

where:
$e(t)=0$ at the frame boundaries,
$S^{(i)}(t)$ is the $i^{th}$ wave packet, and
$b^{(i)}_k$ is the $i^{th}$ bit sequence.

Figure 11A:
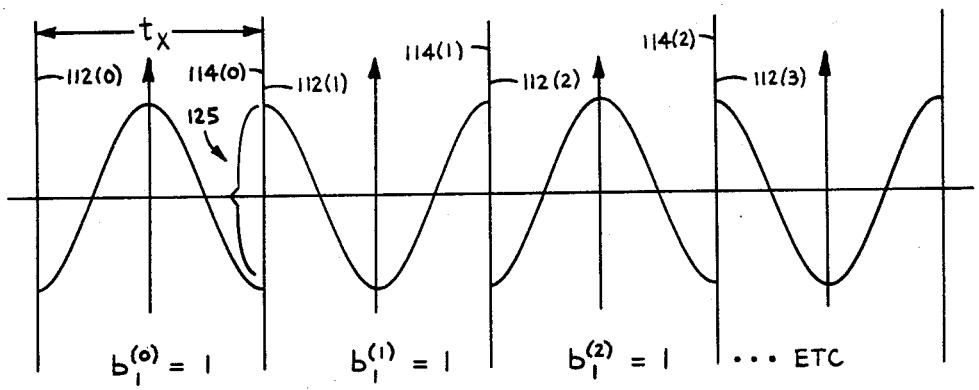
FIG. 11A illustrates the possibility of producing discontinuities at frame boundaries in the modem embodiment.
Figure 11B:
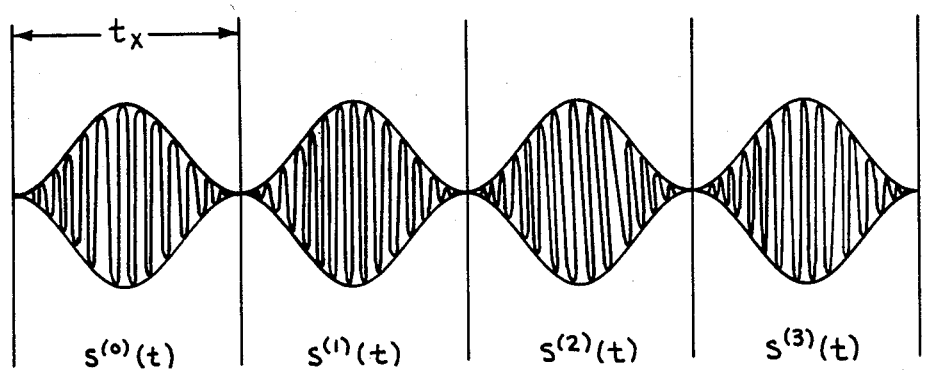
FIG. 11B shows the successive partial wave packets involved in the modem embodiment.
Figure 11C:
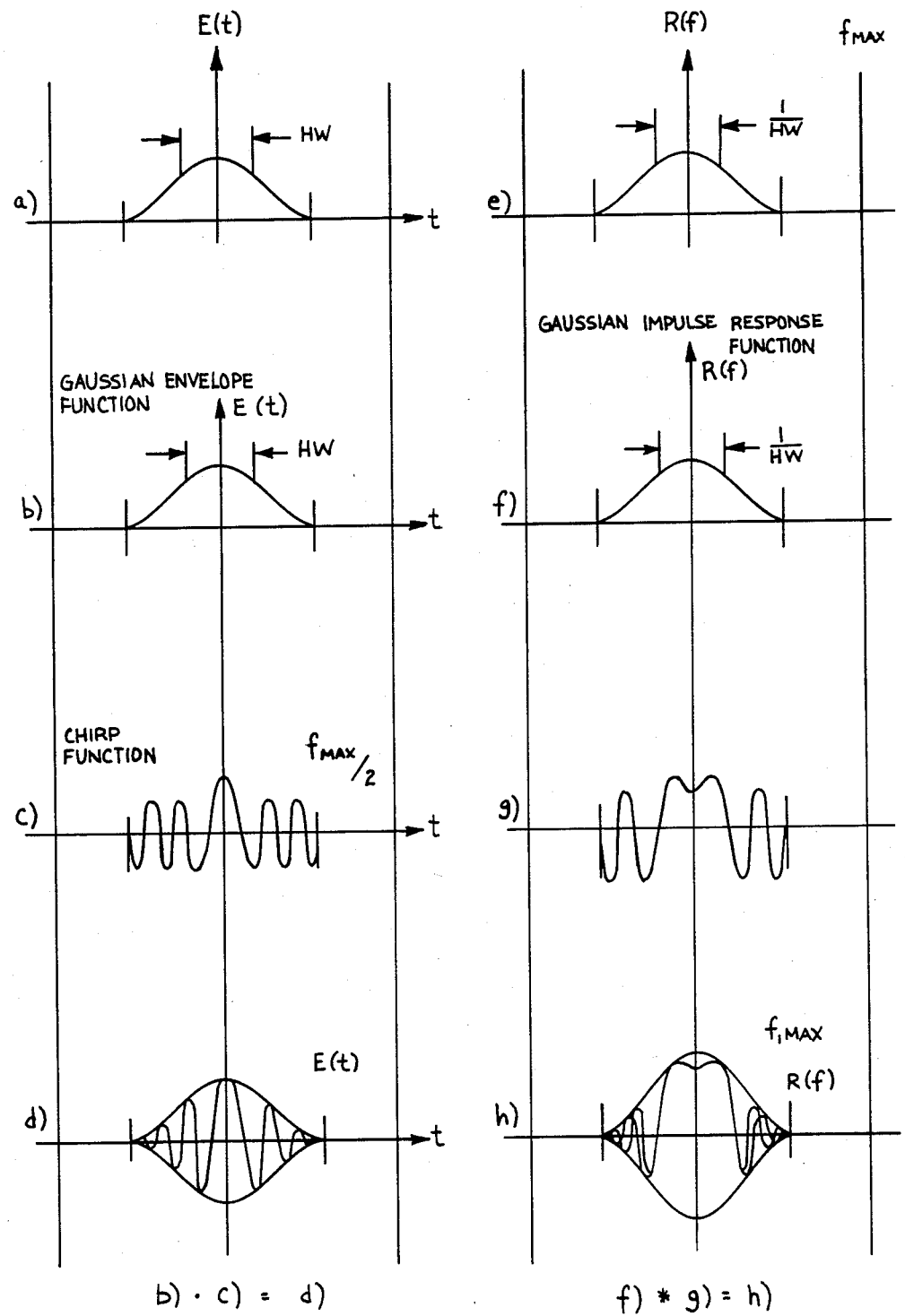
FIG. 11C shows the waveforms in connection with a preferred embodiment of the invention involving the use of a spread function to minimize the degradation of system performance due to non-linear distortion and channel noise.
Figure 16:
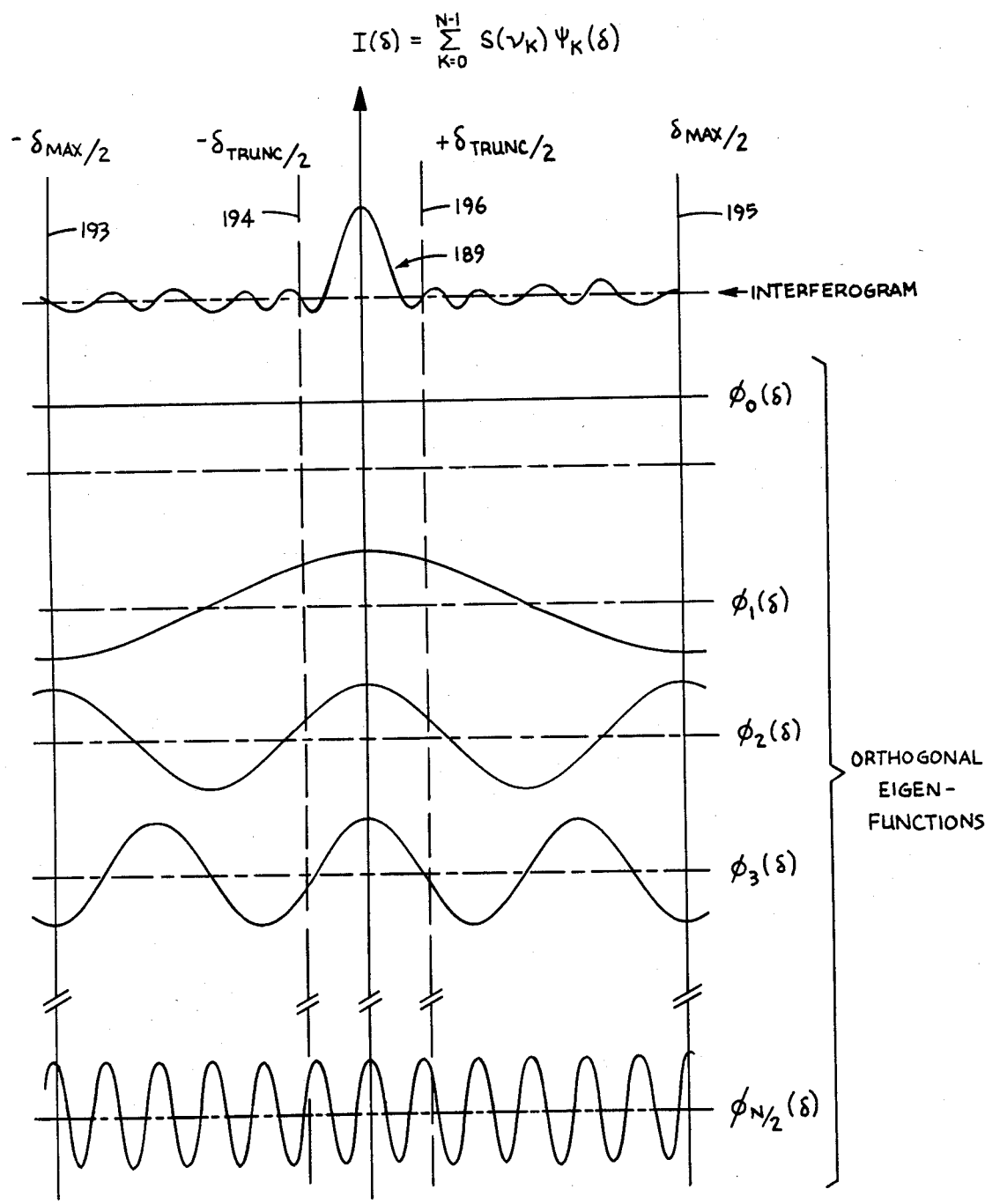
FIG. 16 illustrates the decomposition of the interferogram into othogonal eigenfunctions.
Figure 17:
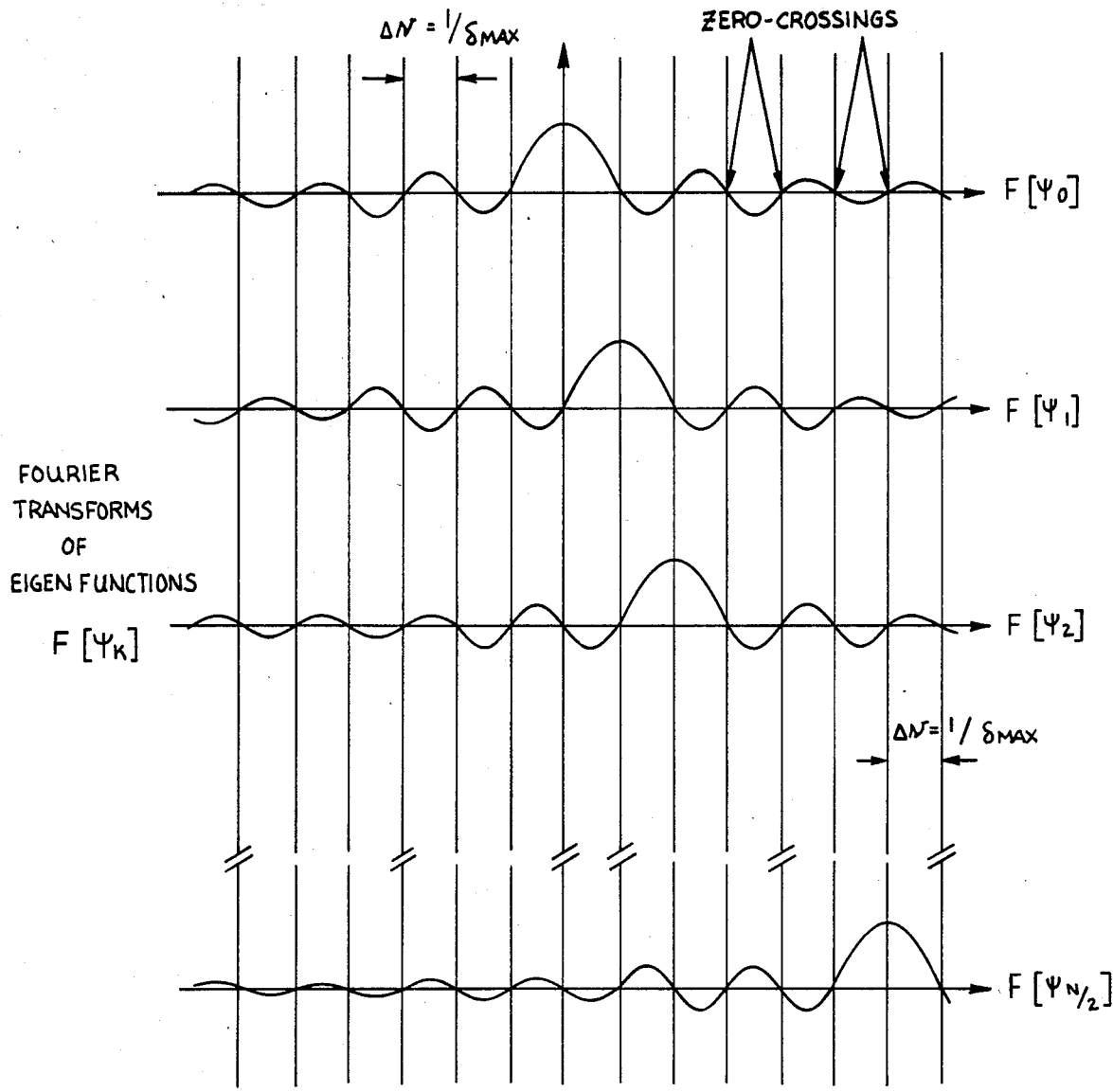
FIG. 17 shows the Fourier transforms of the eigenfunctions of FIG. 16.

Successive partial wave packets are shown in FIG. 11B.

Another practical problem arises due to the effects of electronic dispersion in the analog channel, i.e. the effects of frequency-dependent phase shift factors. Because the bit information carried by each partial wave is determined at the receive by detecting a 180 degree phase shift ($b_k=1$ or $-1$), any dispersion will reduce the effective deconvolver signal/noise ratio. Dispersion of the wave packets is eliminated by a unique arrangement referred to herein as the analytic signal converter (see FIG. 6), which is a digital signal processor for removing dispersion. The dispersed, sampled partial wave packet $S(t)$ is first separated into even and odd parts (FIG. 6, Blocks 69 and 71, respectively). Then the odd part is 90 degree phase shifted by a Hilbert transformer 75 and added to the even part in adder 77, forming a real output R. The even part is likewise Hilbert transformed in block 73 and added to the odd part in adder 79, forming an imaginary output I. These real and imaginary outputs constitute an analytic signal, i.e. its Z-transform is causal. A real N/2-length bit sequence encoded into a partial-wave packet, and sent through a dispersive channel, will be converted by this means into an analytic signal whose deconvolved inverse Z-transform is real and causal and is precisely the received bit sequence $b_k$. The wave packet need only be approximately centered in the inverse Z-transformer's memory, easily done by a simple analog circuit known to the skilled worker.

SPREAD SPECTRUM TECHNIQUES

An alternate envelope function $E(t)$ may also be employed to increase effective system jamming margin by spreading possible non-linear distortion over the maximum possible bandwidth, that is decreasing system error rate due to analog channel non-linearities. If $E(t)$ is presumed to be a simple Gaussian function whose value is comparable to system noise level at the frame boundaries (of half-width HW), then its Fourier transforms will also be a Gaussian function of half-width 1/HW (see FIG. 11C). Therefore, the impulse response function $R(f)$ in equation (1) is a Gaussian.

As shown by the above, the effects of dispersion are removed by the analytic signal converter. Using a spread function for the envelope function (FIG. 11C), the degradation of system performance due to non-linear distortion and channel noise can be minimized. For example, assuming the number of sample points/frame $N=256$, and a compression ratio $M=16$, and using a Gaussian envelope function $e(t)$, the half-width $R(f)$ of equation (1) is about $f_{max}/\sqrt{N}=f_{max}/16$.

Now, if $e(t)$ is of the form $$e(t)=g(t)[e^{i2\pi/N \cdot M}]^{t2/2}$$

where $g(t_n)$ is a Gaussian, and $[e^{i2\pi/N \cdot M}]^{t2/2}$ is a chirp function of max frequency equal to channel bandwidth, then the bandwidth of the response function $R(f)$ is equal to the full channel bandwidth $HW \cdot \sqrt{N}=f_{max}/2$, and any non-linear channel distortion is spread over the entire channel bandwidth, so that any degradation of the deconvolver signal/noise ratio due to distortion will be minimized.

SUPER-RESOLVING Z-TRANSFORM SPECTROMETER EMBODIMENT

The concepts of the present invention can be applied to systems other than a transmit-receive system, and a particularly natural application is found in the optical field where an interferogram is developed directly from an optical instrument, and no channel transmission line is involved. with reference to FIG. 12, a super-resolving Fourier transform spectrometer will now be described incorporating the advantages and concepts of the present invention.

The arrangement of FIG. 12 comprises an electro-optical apparatus for obtaining the optical spectrum of a beam of light. The optical apparatus shown at 128, for example, introduced a phase retardation in one arm of a Michelson interferometer 128 by mounting a mirror to a piezoelectric translation stage 45. An electro-optical clock interpolator 17 effectively provides a frequency-multiplied, phase coherent clock from a laser fringe clock as will be described. The developed interferogram on line 48 is analog-to-digital converted in the ADC 163.

Analytic signal converter 53 converts the dispersed, real interferogram from ADC 163 into a non-dispersed complex interferogram having real (177) and imaginary (179) parts. As in the modem embodiment, an inverse Z-transform processor, shown in FIG. 12 as known type of chirp Z-transformer 55, detects the strength of N partial waves in the interferogram, i.e. the chirp Z-transformer 55 constitutes a partial-wave coherent detector.

The linear deconvolver 57 operates in a manner similar to that described in connection with the modem embodiment of FIG. 6 and serves to digitally deconvolve the optical spread function which arises by truncating the interferogram.

The truncation of the interferogram is accomplished by taking a very short scan, i.e. effecting a limited movement of the mirror by the piezoelectric stack 139. The fast clock 161 applied to the sampler and analog-to-digital convertor 163 effects sampling of the resulting truncated interferogram at a frequency higher than the laser fringer clock frequency so a to allow all the signal processing to be performed digitally.

Figure 22:
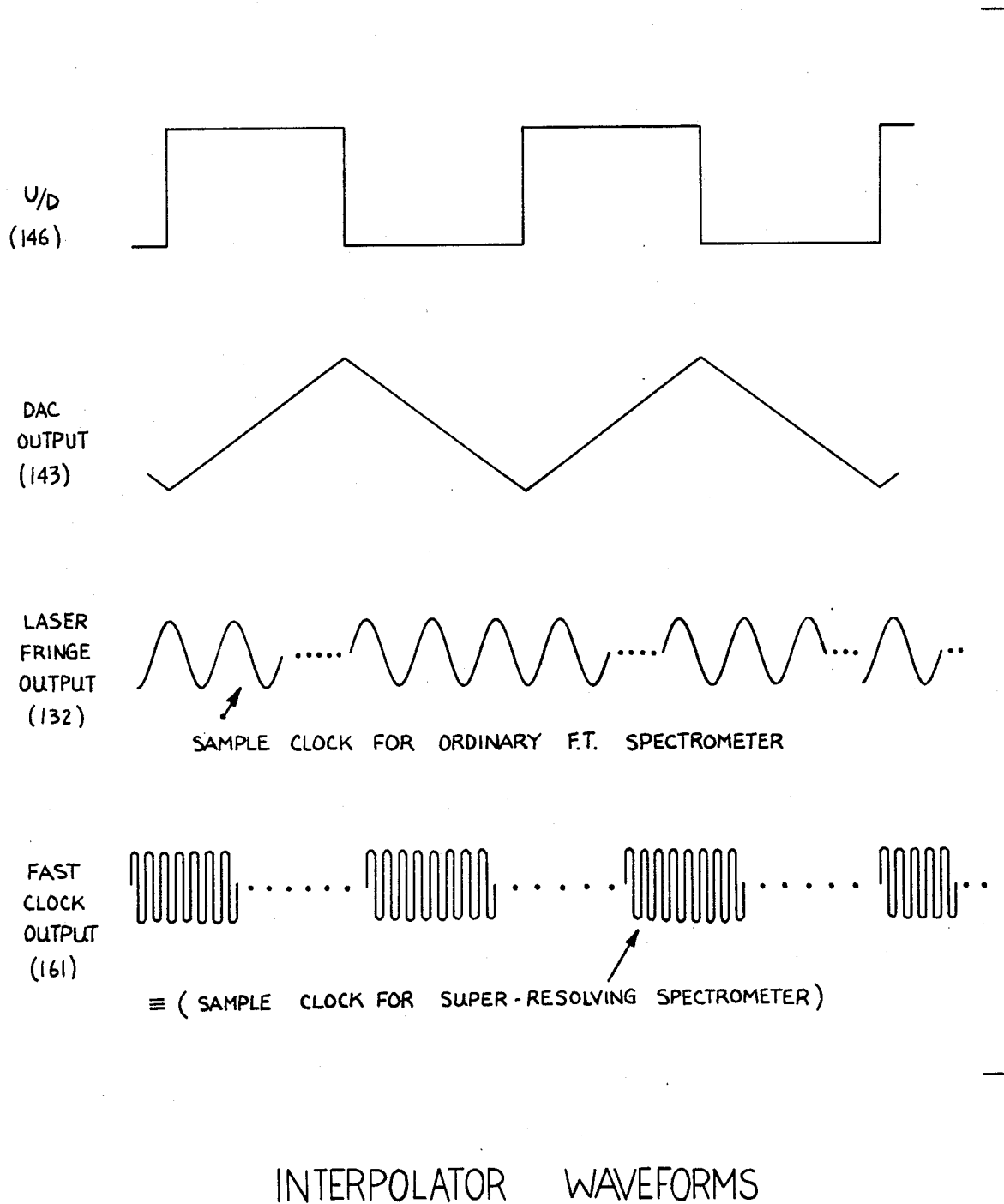
FIG. 22 shows the waveform relationships of the optical phase interpolator of FIG. 21.

The higher than laser fringe clock frequency is produced by an interpolation process to be described in connection with FIG. 22. For the present, it is sufficient to understand that the optical phase interpolator 17 multiplies the fringe frequency of the laser beam 129 detected at detector 137 to provide a high frequency (fast) interpolated clock on line 162. The combination of the Michelson interferometer spectrometer 128 and optical phase interpolator 17 form an electro-optical servo-mechanism which multiplies the fringe frequency of the laser beam and so provides the interpolated clock.

Figure 20A:
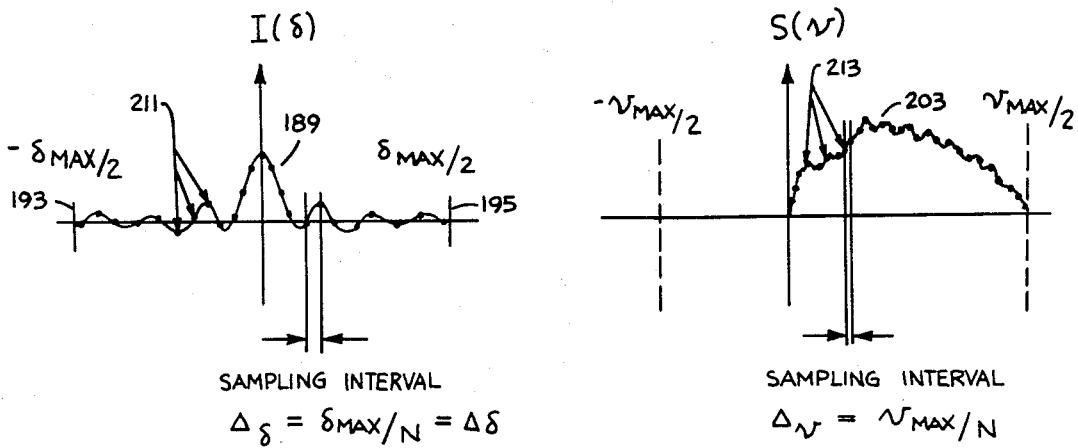
FIG. 20A shows a sampled interferogram and associated spectrum.
Figure 20B:
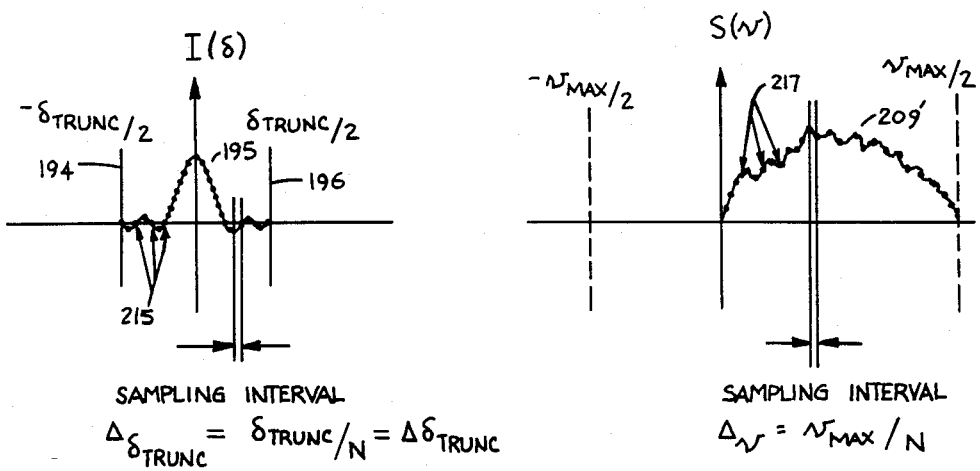
FIG. 20B shows a sampled truncated interferogram and associated spectrum.

The optical phase variation in the spectrometer 128 creates the interferogram at detector 133, and the interpolated laser clock 162 samples the interferogram in ADC 163. The accuracy of the interpolated clock will determine the ultimate signal processing accuracy and thereby the wavenumber resolution. Existing Fourier spectrometers typically use a laser beam 129 traveling through the same interferometer as the signal beam 127 to provide a sampling clock 132. In FIG. 12, this is made possible by the construction of the broad band light source 125 which projects a collimated multi-wavelength light source with the concave reflector shown, toward beam splitter 131. A separate laser light source 51 projects its collimated beam through a tiny hole in the rear of source 125. Both the broad band beam and the laser beam travel the same path through the Michelson interferometer, except that the laser beam is split off at concave mirror 135 through a small hole in its center, allowing the broad band light beam to be focussed on square-law detector 133, the output of which is the inteferogram in line 48. Then, laser light 130 passing through mirror 135 is detected at detector 137, producing a sine wave as moving mirror 213 travels between its bounded limits. The electro-optical servo mechanism moving mirror 213 (FIG. 23), then, introduces optical variations for both the source laser beam and the broad band light beam. The sine wave thus produced at detector 137 can be used as a sampling clock in accordance with known principles and processes. This method results in Conne's advantage, i.e., absolute wavenumber accuracy, because samples are taken at precisely measured increments of phase retardation. In contradiction thereto, the present invention takes the same number of samples over a much shorter scan (producing maximum retardation). Thus, in order to retain Conne's advantage, one must accurately interpolate clock pulses between the usual laser fringe clocks (to be discussed in connection with FIG. 20A and 20B).

Included in the interpolator clock arrangement is a piezoelectric stack translation stage 45 comprising a plurality of piezoelectric crystal plates, a mirror mount, and a moving mirror 213 (FIG. 23) which translates along the optical axis as a function of an applied electrical potential to the piezoelectric plates, without appreciably tilting the mirror as it moves. This arrangement for effecting optical phase variation is entirely solid state, and accounts for many of the rugged characteristics of the invention.

As a basis from which to develop the unique characteristics of the present invention, a brief description of a prior art Michelson interferometer will now be described.

As with the present invention, the Michelson interferometer 128 creates an interferogram $I(\delta)$ as denoted in FIG. 13. In that figure, a broadband light source beam 127 is passed through the interferometer to produce $I(\delta)$. When a sample 134 to be analyzed is placed in the source beam 127, only certain wavelength components, not absorbed by the sample, pass through the optics to be detected by detector 133, whereby the output 132 is representative of a wavenumber spectrum of the sample.

In FIG. 14, a similar arrangement is shown, but employing a transparent moving wedge 45'. The movement of wedge 45' in the direction of the arrow ($\Delta W$) causes more or less thickness of the wedge to be inserted in the beam path, and the changing refraction path for the beam as the thickness of the wedge chanes introduces the necessary optical retardation to produce the interferogram. FIG. 15 shows the output of the interferogram 189 $I(\delta)$ from either FIG. 13 or 14, and together with its Fourier transform 191 $S(\nu)$.

In either type of Michelson interferometer employing an ideal beamsplitter, the output of the square-law detector 133 is the interferogram $$I(\delta) = \int_{-\nu_{max}/2}^{\nu_{max}/2} S(\nu) \cos 2\pi \delta \, d\nu \qquad (2)$$

where
$S(\nu)$ is the wavenumber spectrum of the broadband source,
$\nu$ is wavenumber in cm$^{-1}$,
$\delta = 2\Delta x$ is optical retardation in cm,
$\Delta x$ is mirror motion,
$I(\delta)$ is the detector output signal, and maximum optical frequency is assumed to be $\nu_{max}/2$ for mathematical convenience.

A practical Michelson interferometer includes a dispersive beamsplitter. Real-world beamsplitters made by coating KBr with germanium introduces an optical dispersion term, $\delta_d$, defined as optical phase retardation versus wavenumber. Equation (2) then becomes $$I(\delta) = \int_{-\nu_{max}/2}^{\nu_{max}/2} |S(\nu)| \cos 2\pi\nu(\delta + \delta_d(\nu)) \, d\nu \qquad (3)$$

This has the effect of dispersing the interferogram into a sum of even and odd components (cosine and sine series)

$$I(\delta) = I(\delta)_e + I(\delta)_o, \quad e=\text{even}, o=\text{odd} \qquad (4)$$

According to the known art, the wavenumber resolution of a Fourier transform spectrometer is approximately equal to the reciprocal of maximum mirror movement, as will be seen by the following:

RESOLUTION OF THE FOURIER TRANSFORM SPECTROMETER

In order to determine wavenumber resolution of a Fourier transform spectrometer, the usual approach is to assume a finite decomposition of the interferogram into orthogonal functions, i.e. (for the case of no dispersion):

$$I(\delta) = \sum_{k=0}^{N-1} |S(\nu_k)| \cos[(2\pi/\delta_{max})\delta k] \quad (5)$$

For the fundamental frequency $k=1$, it is seen that the phase of the wave function $\phi max = (2\pi/\delta max)\delta k$ $\phi max = \pm \pi$ radians at $\delta = \pm \delta max/2$.

For $k=2$, $\phi max = \pm 2\pi$ radians, etc. The functions $\psi_k = \cos[(2\pi/\delta)\delta k]$ are orthogonal over the interval $-\delta max/2 \leq \delta \leq \delta max/2$, where $\phi_k = (2\pi/\delta max)\delta_k$ for all values of $\delta$ over the range $-\delta max/2$ to $\delta max/2$. Therefore, $$1/\delta \int_{-\delta_{max}/2}^{\delta_{max}/2} \psi_i \psi_j \, d\delta = \delta_{ij} \quad (6)$$

where
$\delta_{ij}$ is the discrete delta function, and $$\psi_k = \cos[(2\pi/\delta max)\delta k]. \quad (7)$$

Taking the Fourier transform of $I(\delta)$, for $\psi_k = e^{i2\pi\delta k}$, and defining $\Delta\nu = 1/\delta max$ $$\begin{aligned} S(\nu) &= \int_{-\delta_{max}/2}^{\delta_{max}/2} I(\delta) e^{-i2\pi/\delta_{max}} d\delta \\ &= \sum_{k=0}^{N-1} S_k \int_{-\delta_{max}/2}^{\delta_{max}/2} (e^{-i2\pi/\delta_{max}, \delta k}(e^{i2\pi\nu\delta}) d\delta \\ &= \sum_{k=0}^{N-1} S_k \int_{-\delta_{max}/2}^{\delta_{max}/2} e^{i2\pi\delta(\nu-k\Delta\nu)} d\delta \\ &= \sum_{k=0}^{N-1} S_k \left[ \frac{e^{i2\pi\delta(\nu-k\Delta\nu)}}{e^{i2\pi(\nu-k\Delta\nu)}} \right]_{-\delta_{max}/2}^{\delta_{max}/2} \\ &= \sum_{k=0}^{N-1} S_k \left[ \frac{\sin(\pi\delta_{max}(\nu-k\Delta\nu))}{\pi(\nu-k\Delta\nu)} \right] \end{aligned} \quad (8)$$

Therefore, $S(\nu)$ is a sum of sync functions of half-width $=1/\delta max$, weighted by the $S_k$'s and displaced by $k\Delta\nu$.

Accordingly, when digital resolution $\Delta_d = \nu max/N$ (where N is the number of data points, and equals optical resolution $1/\delta_{max}$) we then sample at the frequency points where all the sync functions have zero-crossings except for the desired frequency component. Therefore, the functions are orthogonal. As $\delta_{max}$ decreases, the spacing between zero-crossings increases so that the optical resolution is less than digital resolution, so the eigenfunctions become non-orthogonal. However, as long as they are linearly independent, optical resolution can be obtained comparable to the digital resolution by the present invention.

PRACTICAL CONSIDERATIONS

Fourier transform spectrometers (FTS's) have intrinsic advantages and disadvantages.

(a) Fellgett's advantage. Also known as the multiplex advantage, referring to the fact that a Michelson interferometer acquires interference data on all frequency information. Thus, an FTS is about N times faster than a dispersive instrument.

(b) Jacquinot's advantage. Known as throughput advantage, it states that the aperture used must not necessarily be a slit, (as in dispersive instruments) leading to more sensitivity.

(c) Conne's advantage. Because we can use a laser to provide a stable and accurate sampling clock system, we find we have intrinsic wavenumber accuracy.

(d) Disadvantages. The major disadvantage in FTS lies in the requirement that we must move the mirror so far (for $\Delta\nu = cm^{-1}$ we have $\delta max = 1/1$ $cm^{-1} = 1$ cm). In order to maintain coherence and a high signal/noise ratio, less than 2 arcseconds of alignment must be maintained as the mirror is moved over 0.5 to 1 cm. Complex electromechanical servo-mechanisms, as well as air bearings are required. These are delicate, expensive, hard to keep from tilting in use and in accurate alignment, and they introduce uncertainties into the spectral data. Other disadvantages include the complexity of the signal processing electronics, though increasing availability of inexpensive integrated circuit are bringing this cost down. If an entirely solid-state optical head were possible, as with the present invention, the optics could be easily replicated, leading to further cost savings.

SUPER-RESOLVING FOURIER TRANSFORM SPECTROMETER

Recognizing these and other disadvantages of moving-mirror type Fourier transform spectrometers, the analyzer examples embodiment of the present invention concerns an improved Fourier spectrometer which requires the mirror to the moved only a very short distance, yet still retaining resolution and signal/ noise performance comparable to existing (Michelson) Fourier spectrometers.

THE SUPER-RESOLVING FTS OF FIG. 12

The basic goal here, then, is to contrive to calculate a high resolution spectrum but only require the mirror to move a small amount. This can be done and still keep the mirror flat very easily by an off-the-shelf piezoelectic translation stage 45. Super-resolution in electronic imaging systems has been studied extensively over the past ten years (see Prost and Guatto, supra), and much has been learned in this field. The superresolving FTS according to the present invention was conceived in full acknowledgement of the contribution and technical advance in the art by these procedures.

It will be self evident to one skilled in the art of spectrometers that the employment of a solid-state piezoelectric mirror moving device and the resulting minimal mirror movement, if attainable, would have tremendous advantages and extended applications of use. An FTS of this type could be permanently aligned, would be smaller, more compact, more rugged, would be able to operate in any position, would be less sensitive to vibration, would not require a nitrogen bottle for air bearings, would exhibit more repeatable measurements, would be able to be replicated (mass produced), and would be potentially faster and more sensitive. Potential applications for such an FTS would include portable, rugged lab instruments, emission spectrometers (poison gas detector), industrial process controller (e.g, determine mylar tape quality control, etc.), automotive emissions analyzers, industrial pollution monitors, fuel quality control for aircraft and shipping industries, medical diagnostics, and similar application. In other words, low cost, and more rugged instruments could open up many new markets for FTS applications.

BASIC TECHNIQUE

Referring to FIGS. 6 through 18, it can be seen that is we truncate the interferogram 189 at the dotted lines 194, 196, we are effectively simply decomposing the interferogram into a set of non-orthogonal functions, similar to the modem discussion of FIGS. 8 and 9. Truncating the interferogram is equivalent to moving the mirror only a small amount, i.e., taking a short scan. It will be shown that great advantage is attained by a significantly reduced mirror movement.

Truncating the interferogram 189 in this manner is equivalent to convolving the high resolution spectrum with a sync function $\delta \nu \sim 1/\delta_{trunc}$ wide, thereby smoothing the high resolution spectrum and resulting in the low resolution spectrum computed by simply transforming the truncated interferogram (see FIG. 19B(c)).

The basic problem may be stated $$S_{Lo}(\nu) = \int_T S_{Hi}(V) R(\nu - V) dV \qquad (10)$$

When $S_{Hi}(\nu)$ is band-limited, i.e., has "a priori" known bounded support T, the equation becomes a first kind Fredholm integram equation, i.e., we must solve for $S_{Hi}(\nu)$, and $R(\nu)$ is a non-casual impulse response function (also called a sync function and the instrument response function) which has no inverse. In formula (10), $S_{Lo}(\nu)$ is effectively the convolution of $S_{Hi}(\nu)$ and $R(\nu)$.

Equation (10) can be solved exactly for the no-noise case by the method of Ville and Gerchberg (see Prost and Goutte, supra), as will be more fully discussed lated in this description. This method involves a series of successive approximations and can be guaranteed to converge by a kernel-splitting technique, repeated iterations leading to an infinite series which can be summed, and results in a non-iterative solution. It can be proven that for the case of no noise, this series of approximations will always converge to the exact values of the function $S_{Hi}(\nu)$, i.e., the solution will retrieve exactly the high resolution spectrum from the transform of the truncated interferogram when:

(a) N data points are taken (will converge in N steps, 2N steps for non-causal $R(\nu)$), and (b) $R(\nu) < 2$, always true for passive convolution.

CHIRP-Z TRANSFORM

We can consider that the sampled, truncated interferogram is the Z-transform of the low resolution spectrum. A chirp Z-transform is used to map the N points between $0 \to \delta_{trunc}/2$ to the N points between $0 \to \nu_{max}/2$, i.e., $$S_{Lo}(\nu_n) = W^{n2/2} [(I(\delta_k) W^{k2/2}) * W^{-k2/2}]$$

where $$W = [e^{-i2\pi/NM}]$$
$$I_k = \Sigma S_{Lo}(\nu_n)[e^{i2\pi/NM}]^{nk}$$

where $z = [e^{i2\pi/NM}]^k$, and $M = \delta_{max}/\delta_{trunc}$ is the truncation ratio.

Use of the Z-transform insures that the N statistically independent interferogram points are transformed into the N independent low resolution spectrum points, i.e., that $S_{Lo}(\nu_n)$ is oversampled. This is necessary to insure that $S_{Lo}(\nu_n)$ can properly be deconvolved in the presence of noise.

OPERATIONAL DESCRIPTION OF THE SUPER-RESOLVING SPECTROMETER OF FIG. 12

With the above as background, a detailed discussion of the separate major blocks of FIG. 12 will now be given

OPTICAL RETARDATION (a) As aforementioned, the present invention involves an improved version of a Michelson type Fourier transform spectrometer, and could employ any means of effecting the required optical retardation, including moving a mirror (FIG. 13) or a moving wedge (FIG. 14).

Since one of the principal benefits of the present invention lies in its ability to produce high resolution spectra with a minimum of optical phase retardation, one is then able to use a simple solid-state piezoelectric translation stage to move a mirror in order to effect the required retardation. Because the maximum practical mirror translation distance available by this means is only 50-100 microns, previous spectrometers could not use this simple method.

The Piezoelectric translation stage is available off-the-shelf from a number of manufacturers (see FIGS. 23A and B).

The moving mirror 211 is coated with a metallic or dielectric reflector 213, and is attached to a stack of Piezoelectric elements 139 which when driven by high-voltage amplifier 219 by connections 218, result in a uniform longitudinal expansion or contraction of said elements 139. Thus, by mounting this assembly firmly to the optical base by means of support 217, one is able to translate mirror 211 among the optical axis by means of a triangle wave voltage input to amplifier 219. This longitudinal translation is accomplished with inherently minimum mirror tilt, and can operate equally well in any position. No bearings of any type are required. Because of the minimum of mirror tilt per translation distance, the present invention enjoys high fringe visibility leading to high field-of-view and signal/noise ratio.

Although the present invention is not limited to the piezoelectric mirror translation method, or to moving a mirror by any specific means, the piezoelectric mirror is employed in the preferred embodiment, because its simple and rugged characteristics result in the previously discussed practical advantages.

(b) Interpolation of Laser Reference Clock

Figure 21:
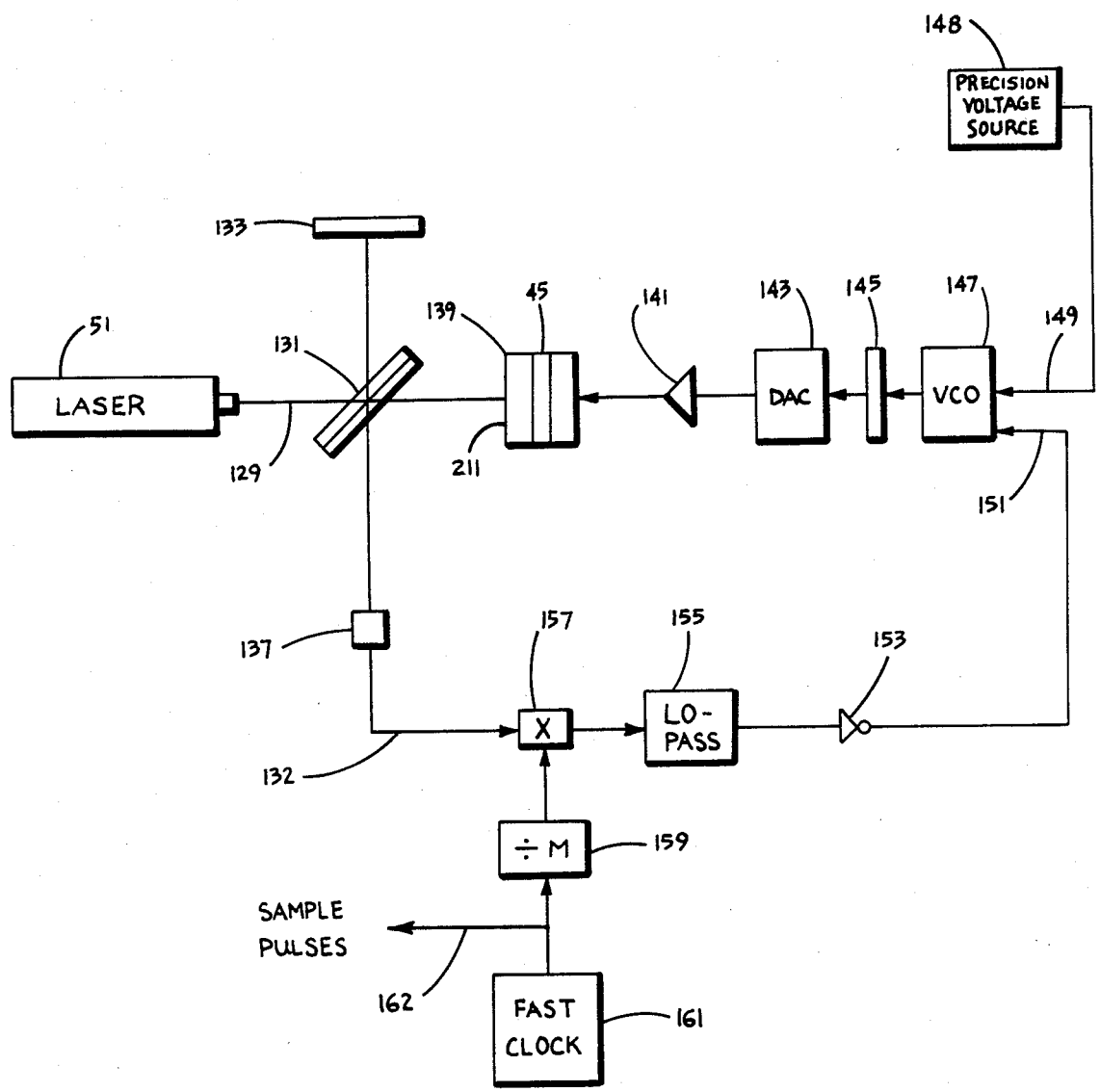
FIG. 21 isolates the optical phase interpolator of FIG. 12 for ease of discussion.

In the present invention, maximum phase retardation $\delta_{trunc}$ is a factor of M smaller, so the required sample intervals $\Delta\delta$ are M times smaller, i.e., M clock pulses must be interpolated between the usual laser clocks $(\delta_{max}/N = M_{trunc}/N)$. This is accomplished by means of an optical phase interpolater as shown isolated from the rest of the apparatus in FIG. 21.

Included a preferred embodiment of the clock interpolator 17 are the following:

a piezoelectric moving mirror translational driver 45, a laser clock source 51, a beamsplitter 131, a fixed mirror 133, a hi-voltage amplifier 141 for the translational driving means 45, a digital-analog converter (DAC) 143 for converting a digital count into an analog voltage, an up/down counter 145 supplying a digital ramp to the DAC 143, a voltage-controlled oscillator 147 supplying clocks to the counter 145, and so effecting a voltage-controlled ramp period, a silicon detector 137 which converts the laser fringes into a low-frequency sine wave, an analog multiplier 157 which compares the phase of the laser fringe frequency from the detector with the divided-by M fast clock 159, 161.

a low-pass filter 155 and inverter 153 which supplies the error voltage (negative feedback) necessary to controllably generate the VCO-generated ramp which, in turn, determines the laser fringe frequency to track the divided-by M fast clock.

All the above defined elements correspond to a frequency-multiplying electro-optical phase-locked loop 17, and force the laser fringe frequency to track the phase and frequency of the divided-by M fast clock. Therefore, the fast clock is M times faster and phase coherent with the laser fringe clock.

This configuration is essentially an electrooptical frequency multiplying phase-locked loop, and in order to understand its operation, it is useful to examine its open-loop characteristics.

This can be done by breaking the connection between the inverter 153 and the error voltage input 151 into the voltage controlled oscillator (VCO) 147. When this is done, the VCO outputs a clock at fr, a frequency determined by the voltage output on line 149 from precision voltage source 148. The VCO output is fed into an up/down digital counter 145 whose output bits drive a digital-to-analog converter 143, the output of which is a triangle wave (see FIG. 22).

The triangle wave (143) is amplified by a high voltage amplifier 141 used to drive a piezoelectric stack 45 attached to the moving mirror 211. The motion of the mirror 211 results in an optical phase retardation in one arm of the Michelson interferometer 17 formed by beamsplitter 131, fixed mirror 133, moving mirror 211, and detector 137.

Therefore, because the output of the layer 51 is a monochromatic beam, the output 132 of the detector 137 will be an approximately constant frequency sine wave (laser fringe output) whose frequency is proportional to the frequency of VCO 147. According to the present invention, this signal (132) is then multiplied with the fast clock 161, divided by M in divider 159, by an analog multiplier 157. The low-pass filter 155 has an output then that represents the phase difference between the layer fringe clock 132 and the divided-by-M fast clock. This phase difference is then inverted by inverter 153 and results in an error voltage 151 input to VCO 147. By standard phase-locked loop theory, when the connection between inverter 153 and VCO 147 input 151 is established, the error voltage will cause the VCO 147 to oscillate at the correct frequency to result in a triangle wave input to the mirror drive causing the frequency of the fringe clock 132 to track the divided-by-M fast clock from circuit 159. Therefore, the fast clock 162 will be frequency coherent and synchronous with the usual laser clock 132, but faster by a factor of M. Sample pulses 162 are then used to sample the interferogram signal by analog-to-digital converter 163 (see FIG. 12).

(c) Analytic Signal Conversion

The output of an ideal Michelson interferometer is a purely real and even signal. However, in a real-world interferometer, because of the effect of optical dispersion (variation of refractive index with wavenumber) the interferogram will be, in general, composed of an even and odd part. Its Fourier transform will then be complex. Since only the magnitude spectrum has any physical meaning, existing Fourier spectrometers either calculate it directly (square root of the sum of the square of the real or imaginary parts method) or employ phase correction methods. The present invention solves this problem another way, which results in certain advantages, by the use of a technique called an analytic signal conversion (see FIGS. 24 and 25).

An analytic signal is herein defined as a complex waveform whose real and imaginary parts form a Hilbert transform pair and whose real part is even and whose imaginary part is odd. The Fourier transform of an analytic signal is real and causal, i.e., $S(\nu)=0$ for $-\nu max/2 \leq \nu \leq 0$. Therefore, by converting the interferogram to an analytic signal before doing the transform, we arrive at the real magnitude spectrum upon transforming, and in addition we have zero-filled the spectrum by a factor of two. This fact will be useful in the later operation of fast deconvolution which requires FFT's (fast Fourier transforms) to be performed that are twice the size of the spectrum being deconvolved. Referring to the upper section of FIGS. 19A and B, the real part of the analytic signal (the interferogram) is shown at 19A(a) along with its causal spectrum at 19B(a). It is seen that $S(\nu)=0$ for $\nu max/2 \leq \nu \leq 0$. The low resolution inverse transform 19B(c) results from the truncated Z transform of 19A(c) similar to that discussed in connection with FIGS. 10A and B in the modem case.

The analytic signal converter performs the following operations:

extracts the even part and the odd part from the dispersed interferogram, converts the purely even part into a purely odd part and converts the purely odd part into a purely even part using 90° phase shifters, or Hilbert transformers 169, 171 (HT), and sums the purely even part with the Hilbert transformed odd part (real part of analytic interferogram), and sums the purely odd part with the Hilbert transformed even part (imaginary part of analytic interferogram) in summing amplifies 175, 173, respectively.

The above elements constitute the analytic signal converter, and the (Fourier) transform of the analytic interferogram is a real and causal spectrum.

Figure 25B:
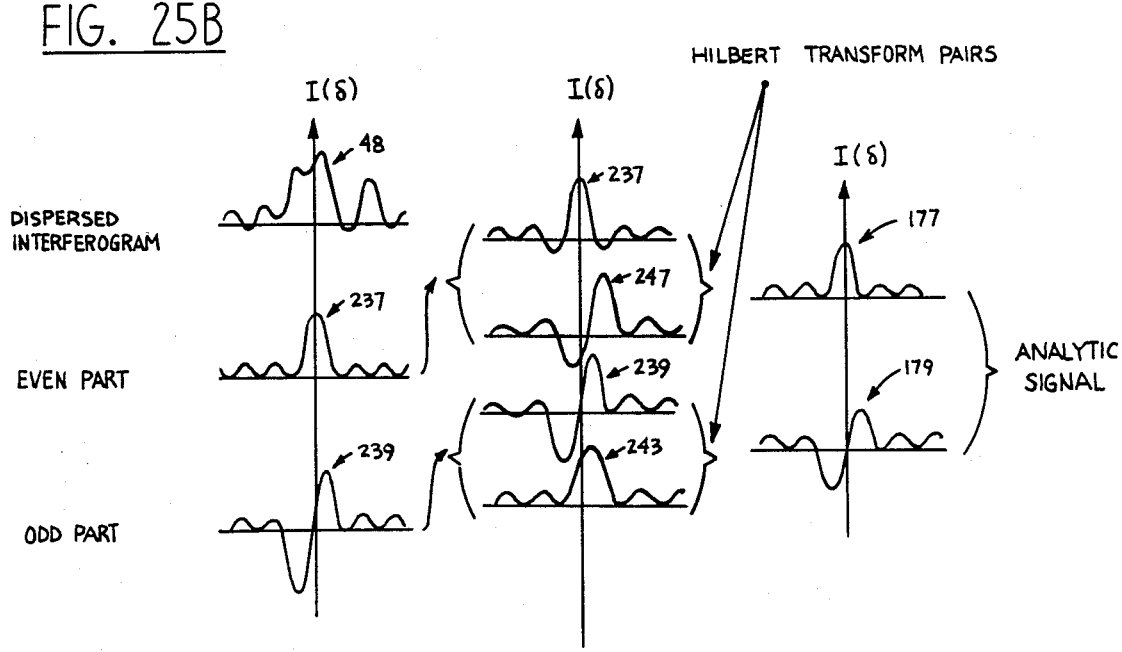

The operation of the analytic phase converter may be understood by referring to FIGS. 12 and 25. As will be observe, for the dispersive case, the even and odd parts of the signal are separated. The analytic converter converts the dispersed interferogram into a complex signal whose transform is real, positive, and causal. The truncated, dispersed interferogram signal 48 is sampled by the analog-to-digital converter (ADC) 163, and sent to the analytic signal converter 53. The interferogram signal 48 is separated into its even and odd parts 237 and 239 by even and odd detector circuits 165 and 167, respectively. This is done in the usual way by computing:

$$\text{even part} = [I(\delta_n) + I(\delta_{N-n})]/2$$

$$\text{odd part} = [I(\delta_n) - I(\delta_{N-n})]/2$$

where $I(\delta_n) = I_n$ are interferogram samples.

The even part 237 is phase shifted by 90° by Hilbert transformer 169 and added to the odd part 239 by adder 175, so forming the imaginary part 179 of the analytic signal. Similarly, the odd part 239 is phase shifted by 90° by Hilbert transformer 171 and added to the even part 237 by adder 173, so forming the real part 177 of the analytic signal.

FIG. 25 shows the appropriate waveforms for this process.

(d) Partial Wave Detection (by Chirp-z Transform)

Present day Fourier spectrometers arrive at a spectrum by simply computing the Fourier transform of the interferogram, i.e., $$S(\nu_k) = \sum_{n=0}^{N-1} I(\delta_n) \, [e^{i2\pi/N}]^{nk}$$

This process is equivalent to the coherent detection of the energy of each of the orthogonal eigenfunctions $$\psi_k = [e^{i2\pi/\delta_{max}}]^{\delta k}$$

Alternatively, we may consider the detection process to be equivalent to computing a Z-transform, $$S(\nu_k) = \sum_{n=0}^{N-1} I(\delta_n) Z^n$$

where
$Z = [e^{i2\pi/N}]^k$.

In the present invention, because only a truncated interferogram is generated, each of the eigen-functions of interest is also truncated, as can be seen by FIG. 18. Considering each of these truncated eigen-functions to be "partial waves", the present invention uses the process of partial wave coherent detection to compute an independent measurement of each partial wave. This can be thought of as a Z-transform $$S_{Lo}(\nu_k) = \sum_{n=0}^{N-1} I(\delta_n) Z^n$$

where $Z = [e^{i2\pi/NM}]^k$, and M is trunction ratio = $\delta_{max}/\delta_{trunc}$. $S_{Lo}(\nu_k)$ is the low resolution partial wave spectrum.

Each partial wave is linearly independent of all others, but not orthogonal, and each detected partial wave coefficient is dependent on about M others. Referring to FIG. 19B(c), the partial wave spectrum $S_{Lo}(\nu)$ must be deconvolved in order to arrive at the high resolution spectrum $S_{Hi}(\nu)$, FIG. 19B(a). That is, the linear dependencies between coefficients of the partial wave spectrum must be removed by the process of deconvolution.

The necessary Z-transform may be computed by a specific method called the Chirp-z transform, which uses FFT methods and is much faster than the direct method.

According to FIG. 12, the real and imaginary outputs 177 and 179 of the analytic signal converter are connected to the Chirp-z transform section 55. Because the Z-transform output is real and causal, then only the real part 177 need be deconvolved.

Inputted to the chirp-z transformer 55 are a non-orthogonal set of basis functions (partial waves) which can be mathematically defined by the set $(e^{i2\pi/NM})^{nk}$ where N is the desired digital resolution of the spectrometer $(\nu_{max}/N) = \Delta\nu$, M is the interpolation (truncation ratio) where n is any real number and k is a constant. The chirp-z transform (of the sampled interferogram) using this basis (set) is essentially just the outputs of a coherent detector which measures the strength of each partial wave of the truncated interferogram. These outputs are linearly dependent on each other because of the non-orthogonal nature of the basis functions. However, the chirp-z transform gives N statistically independent points each of which constitutes a linear combination of a spectral point and its adjacent spectral points.

Details of the Chirp-Z transform will be examined upon discussion of the preferred embodiment, FIG. 24.

(e) Linear Deconvolution Means

The linear deconvolver 57 removes the aforementioned linear dependency between outputs of the chirp-z transform i.e., it performs linear deconvolution. This is the digital signal processing means which employs the precisely sampled shape information of the smoothed spectrum (i.e., the sampled output from the chirp-z transformer 55) to restore the full resolution spectrum. This is done by simply multiplying the output from the chirp-z transform form by a matrix (deconvolution operator). This operator is calculated by means of the N-steps deconvolution algorithm to be discussed in detail later in this description.

The aforementioned linear deconvolution method takes time proportional to $N^2$ to compute a high resolution spectrum. However, since the function to be deconvolved is a sync function (of the form sin KX/X), it can be factored into causal and anti-causal parts, both of which are shift-invariant. Therefore, the necessary deconvolution can be accomplished by a technique called "fast convolution" which takes time only proportional to $N \log_2 N$. This constitutes the preferred embodiment as will be seen in connection with the description of FIG. 24.

According to FIG. 12, the real output 181 of the Chirp-z transform 55 is a discrete real vector $S_{Lo}(\nu_K)$. In order to remove the aforementioned linear dependencies inherent in the partial-wave spectrum $S_{Lo}(\nu_K)$, the linear deconvolver section 57 operates on the spectrum $S_{Lo}(\nu_K)$ via a deconvolution matrix 185, by means of matrix-vector multiplication 187. This operation results in the high resolution spectrum $S_{Hi}(\nu_K) = S(\nu_K)$, i.e., $$S_{Hi}(\nu_K) = L S_{Lo}(\nu_K),$$

where L is the linear deconvolution matrix. The method for computing L is described in detail later in this description.

OPERATIONAL DESCRIPTION OF PREFERRED EMBODIMENT FIG. 24

The preferred embodiment of FIG. 24 is essentially identical to the embodiment of FIG. 12 except for the deconvolution means 57. The preferred embodiment of FIG. 12 employs a method called fast convolution in order to effect the deconvolution process in a time proportional to $N\log_2 N$, infra.

Accordingly, the deconvolution matrix L can be factored into two Toeplitz matrices, one upper triangular, and one lower triangular, so $$L = L^+ L^-$$

The diagonal element Toeplitz of these two matrices in the frequency domain correspond to vectors in the time (interferogram) domain.

The outputs from the analytic signal converter adders 173 and 175 are multiplied by the product of the Fourier transforms of the diagonal elements of $L^+$ and $L^-$ (deconvolution vectors 223) and then connected to the Chirp-z transform section 55. Therefore, by the convolution theorem the output of the Chirp-z transform results in the deconvolved spectrum $S_{Hi}(\nu_K) = S(\nu_K)$.

The Chirp-z transform is accomplished by multiplying the complex product of the deconvolution vectors 223 and the outputs 173, 175 from the analytic signal converter 53 by the Chirp signal generator 57, then performing the FFT 225. The outputs of FFT 225 are then multiplied by the Chirp signal 229 by complex multiplier 227, and then connected to an inverse FFT section 231, whose output is multiplied by Chirp signal 235, resulting in the Chirp-z transformed, deconvolved analytic interferogram 21, i.e., the high resolution optical magnitude spectrum $S_{Hi}(\nu_K) = S(\nu_K)$.

The advantage of FIG. 24 over FIG. 12 may be seen by setting $N = 4096$, so the fast FTS will enjoy a factor of $N^2/N\log_2 N \approx 341$ speed advantage.

N-STEP DECONVOLUTION ALGORITHM FOR NON-CAUSAL IMPULSE RESPONSE FUNCTION

The N-steps method requires solving the integral equation (changing notation slightly)

$$0(\nu) = \int_T r(\nu - V) i(V) dV \quad \text{(See FIGS. 26 and 27)}$$

Figure 26:
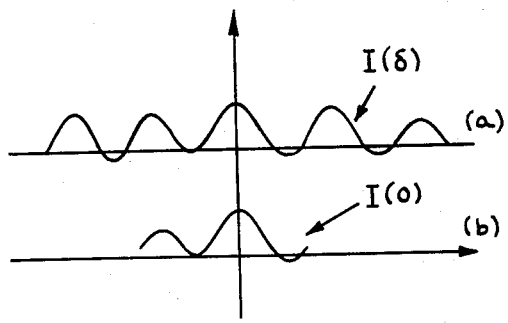
FIGS. 26 through 31 show waveforms and mathematical structures used in explaining the operation of the linear deconvolver.
Figure 27:
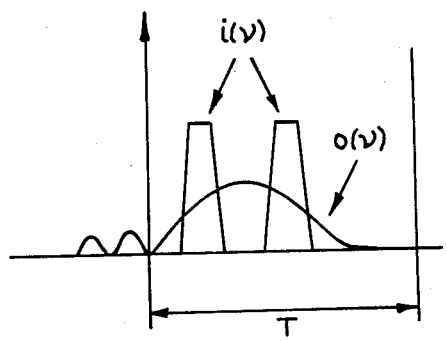

FIG. 26 shows in (a) an unbounded Z-transformed response that may be compared to the normal interferogram signal or a Fourier transform of a wave function comprised of two pulses by way of example, and shows in (b) a bounded Z-transformed response that may be compared to an interferogram produced by limiting mirror movement or a Fourier transform of the wave function that has been truncated, as previously described. The $i(\nu)$ can be restored from $0(\nu)$ (See FIG. 27) by a derivation using the Liouville-Neuman theory of solving integral equations ("Non-iterative and N-steps Iterative Support-constrained Deconvolution Algorithms", Prost and Goutte, supra), leading to the iteration equations $$i^n(\nu) = 0(\nu) - [r(\nu) - \delta(\nu)] * w(\nu) i^{n-1}(\nu)$$

$$i^0(\nu) = 0(\nu)$$

$$w(\nu) = 1 \text{ for } t \in T, 0 \text{ elsewhere.}$$

By splitting the kernel $r(\nu)$, the algorithm will converge in N steps ($r(\nu)$ causal). So $$r(\nu) = k(\nu) + d(\nu)$$

and $$i^n(\nu) = i_0(\nu) - g(\nu) * w(\nu) i^{n-1}(\nu)$$

$$i^0(\nu) = i_0(\nu)$$

$$g(\nu) = d^{*-1}(\nu) * k(\nu)$$

where
$d^{*-1}(\nu) * d(\nu) = \delta(\nu)$ and
$i_0(\nu) = d^{*-1}(\nu) * 0(\nu)$.

This algorithm reduces to equation (a) when $$d(\nu) = \delta(\nu)$$

and $$k(\nu) = r(\nu) - \delta(\nu).$$

For
$d(\nu) = r(0)\delta(\nu) \quad r(0) \neq 0$
$k(\nu) = r(\nu) - r(0)\delta(\nu)$ and $(\nu)$ causal,
the algorithm will converge in N steps.

The discrete version of the Fredholm equation is $$i = \sum_j r_{i-j} i_j$$

or $\phi = R \, I$ where $\phi$ and $I$ are output and input vectors, respectively.

Figure 28:
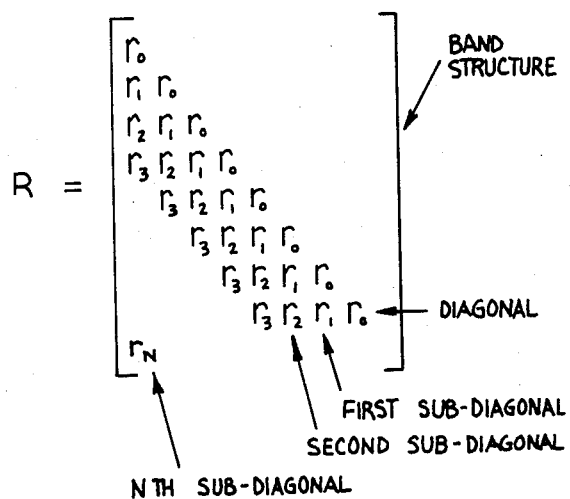

R is a lower triangular Toepliz matrix (FIG. 28).

$$I = [i(\nu_0), i(\nu_1), i(\nu_{N-1})]$$
$$= [0(\nu_0), 0(\nu_1), 0(\nu_{N-1})]$$

$$R = [r_{ij}] \quad r_{ij} = r[(i-j)]\Delta \text{ for } j < i, \text{ and } r_{ij} = 0 \text{ for } j > i$$

Figure 29:
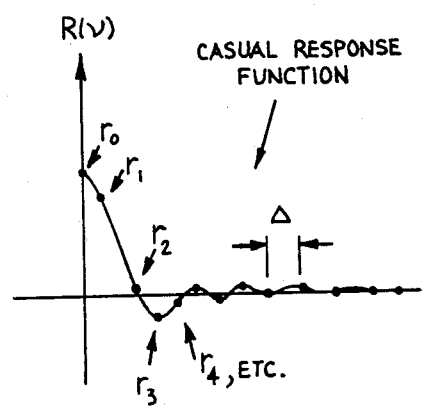

For a causal system, the response function is as shown in FIG. 29.

Therefore, the split kernel becomes $$r = D + K \text{ and } I^n = I^0 - G \, I^{(n-1)}$$

$$I^0 = I_0$$

$$I_0 = D^{-1}\phi \quad (D \text{ is the diagonal})$$

$$G = D^{-1} R - II \quad (II \text{ is the unit matrix})$$

By substitution, $$I^1 = I_0 - G \, I^0$$

$$I^2 = I_0 - G \, I^1 = I_0 - G \, (I_0 - G \, I^0)$$

$$I^3 = I_0 - G \, I^2 = I_0 - G \, (I_0 - G \, (I_0 - G \, I^0))$$

and the pattern becomes clear, i.e., $$I^{n+1} = \sum_{k=0}^{n+1} (-1)^k G^i I_0$$

by forcing the diagonal elements to zero, since $g_{ii} = r(0) / d_{ii} - 1$. Taking $d_{ii} = r(0)$, Then $g_{ii} = 0$, and ---
G is lower triangular with diagonal zero
$G^2$ is lower triangular with diagonal and sub-diagonal zero -continued $G^N$ all diagonals are zero Now define operator $$L = \sum_{k=0}^{N-1} (-1)^k G^k$$

and $I = L\, I_0$

SOLUTION FOR NON-CAUSAL r(ν)

Figure 30:
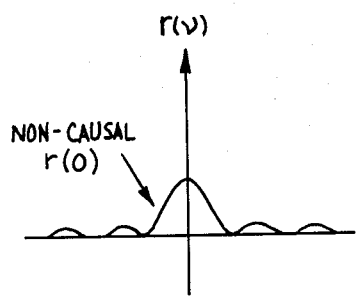
Figure 31:
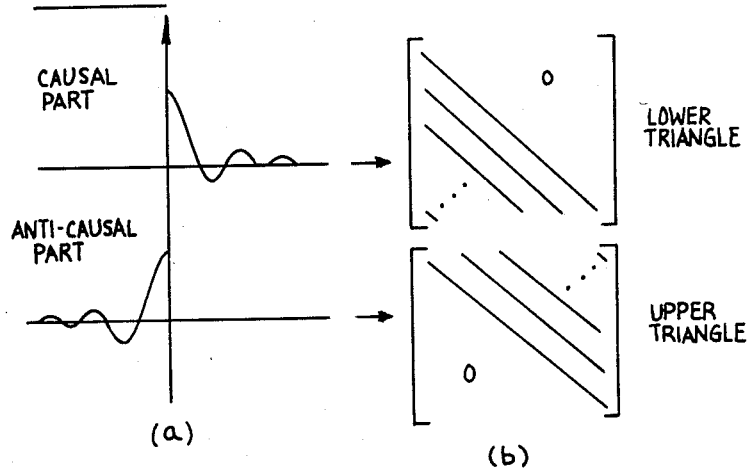

A non-causal response consists of an anti-causal and causal part as seen in FIGS. 30 and 31. the Laplace transform of $r(\nu) \to R(s)$, and by spectral factorization, $$R(s) = R^+(s)\, R^-(s)$$

where
$R^+(s)$ is analytic in right half plane
$R^-(s)$ is analytic in left half plane
and therefore defining
$L[R^+(s)] = r^+(\nu)$ causal part
$L[R^-(s)] = r^-(\nu)$ anti-causal part
so $r(\nu) = r^+(\nu) * r^-(\nu)$ denotes inverse Laplance transform going over to the discrete case, then Toeplitz matrix $$R = r_{ij}$$

where
$r_{ij} = r[(i-j)]\Delta i = 1$ to N, and $j = 1$ to N,
so $R = R^+ R^- I$
$R^+$ lower triangle
$R^-$ upper triangle
Now equation $\phi = R\, I$ can be solved in two steps.

$$\phi = R^+ R^- I$$

$$R_+ = \phi$$

$$R^- I = X$$

Using the above technique both equations can be solved, i.e., $$X = L(R^+)\phi$$

$$I = L(R^-)X$$

So it is seen that $L(R^+)$ and $L(R^-)$ are composed of N submatrices apiece, equivalent to algorithm converging in N steps. Therefore 2N points must be sampled, requiring a double-sided transform, and for an analytic interferogram signal, yields a real, positive and causal restored spectrum, $S_{HI}(\nu_n)$.

FAST SUPER-RESOLVING FTS

Since the spectrum restoration is accomplished by applying matrix equation $I_0 = L\, I$ and $$L = \sum_{k=0}^{N-1} (-1)^k G^k \quad (G \text{ is a convolution operator})$$

it can be done by faste* convolution in the interferogram domain. This allows us to accomplish all signal processing in approximately $4N \log_2 N$ time for $N=8K$ and 1 Mhz FFT butterfly bandwidth, time = 0.224 s.

Although there has been described above specific arrangements of a transform spectrometer for measuring the optical spectrum of a beam of light, in accordance with the invention for the purposes of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined by the appended claims

I claim:

1. In a signal processing system having a system input, a signal transmission channel, and a system output, an improved apparatus for receiving a high resolution signal at the system input and recovering a corresponding high-resolution information signal at the system output, said apparatus comprising:
    means for producing a summation of wave functions representing said input signal;
    means for truncating said summation of wave functions to produce a corresponding summation of partial wave functions;
    means for transmitting the truncated summation of partial wave functions through the signal transmission channel;
    means for detecting the transmitted truncated summation of partial wave functions;
    means responsive to said detecting means for producing a partial wave spectrum from the detected summation of partial wave functions; and
    means for deconvolving said partial-wave spectrum to the values of said system input signal.

2. The apparatus as claimed in claim 1, wherein;
    said truncated summation of partial wave functions comprises real and imaginary parts; and
    only said real part is transmitted through the signal transmission channel of said system.

3. The apparatus as claimed in claim 1, wherein said summation of wave functions representing said input signal exists over a first interval, and said truncated summation of partial wave functions exists over a second interval, said second interval being M times shorter than said first interval, where M is the data compression ratio of the system.

4. The apparatus as claimed in claim 2, wherein said real part of said transmitted signal has even and odd components, and wherein said detecting means comprises:
    means for detecting and outputting said even component;
    means for detecting and outputting said odd component;
    means for shifting the phase of said even component by 90 degrees and summing it with said odd component to reconstruct the non-transmitted imaginary part of said truncated summation of partial wave functions; and
    means for shifting the phase of said odd component by 90 degrees and summing it with said even component to reproduce the real part of said truncated summation of partial wave functions; and
    wherein said means for producing a partial wave spectrum operates on said resulting real and imaginary parts.

5. The apparatus as claimed in claim 3, wherein:

said means for transmitting includes means for producing a continuous series of wave packets, each said packet containing a summation of partial wave functions produced by said means for truncating and having a period of a predetermined length of time, said period defining a bounded frame time;

said system input signal represents a binary bit sequence in one frame time, where said frame time further defines the period of the truncation interval; and said system further comprises means for eliminating any discontinuities that exist at the frame boundaries including means for multiplying the truncated summation of partial wave function by an envelope function which is zero-valued at the frame boundaries.

6. The apparatus claimed in claim 2, wherein:

said transmitted truncated summation of partial wave functions experiences inherent electronic dispersion effects in said signal channel of said system, thereby producing a frequency-dependent phase shift factor; and wherein said system further includes means for eliminating any such dispersion of the wave functions, comprising:

means for dividing said transmitted truncated summation of partial wave functions into even and odd components;

means for shifting the phase of said even component by 90 degrees and summing it with said odd component to produce an imaginary part; and means for shifting the phase of said odd component by 90 degrees and summing it with said even component to produce a real part; and wherein said means for producing a partial wave spectrum operates on said resulting real and imaginary parts.

7. The signal processing system as claimed in claim 1, wherein:

said information signal is a high resolution analog signal;

said means for truncating includes means for producing a time dependent waveform representing a truncated Z-transformation of said input signal, the truncated Z-transformed signal defining a finite sum of a series of non-orthogonal linearly independent partial wave functions; and said apparatus includes:

means for generating an interpolated clock from said time dependent waveform;

means for synchronously sampling said truncated Z-transform signal under control of said interpolated clock;

said means for detecting includes means for reconstructing said time dependent waveform to form a series of orthogonal linearly independent periodic functions;

said means for producing a partial wave spectrum includes means for producing a signal representing an inverse Z-transform of said sampled truncated Z-transform signal; and said means for deconvolving includes means for deconvolving the inverse Z-transform signal function to reproduce said high resolution analog signal.

8. A method for recovering relatively high-resolution information from a partial wave representation of an information signal, comprising the steps of:

producing a partial wave representation of said information signal;

synchronously selecting portions of said partial wave representation of said information signal;

producing an inverse partial wave representation of the selected portions of the transformed signal; and linearly deconvolving said inverse partial wave representation to produce a high resolution equivalent of said information signal.

9. The method as claimed in claim 8, wherein:

said partial wave representation is a bounded Z-transformation representation of an information signal;

said partial wave producing step includes producing a bounded Z-transformation representation of said information signal;

said synchronously selecting step includes synchronously selecting portions of the transformed signal;

said inverse partial wave producing step includes producing a signal representing an inverse Z-transform of the selected portions of the transformed signal; and said deconvolving step includes linearly deconvolving said inverse transform signal to produce a high resolution equivalent of said information.

10. The method as claimed in claim 8, wherein:

said partial wave producing step includes producing a truncated Z-transformation of a high resolution information signal;

said synchronously selecting step includes synchronously selecting portions of the truncated transformed signal;

said inverse partial wave producing step includes producing a signal representing an inverse Z-transform of the truncated transformed signal; and said deconvolving step includes linearly deconvolving said inverse Z-transform signal to reconstruct the original high resolution information signal.

11. In a signal processing system having a system input, a signal transmission channel, and a system output, an improved method for recovering a high resolution signal at the system output corresponding to a high-resolution information signal at the system input, said method comprising the steps of:

producing a summation of wave functions representing said input signal;

truncating said summation of wave functions to produce a corresponding summation of partial wave functions;

transmitting the truncated summation of partial wave functions through the signal transmission channel;

detecting the transmitted truncated summation of partial wave functions;

producing a partial wave spectrum from the detected summation of partial wave functions; and deconvolving said partial-wave spectrum to the values of said system input signal.

12. The method as claimed in claim 11, wherein;

said truncated summation of partial wave functions comprises real and imaginary parts; and only said real part is transmitted through the signal transmission channel of said system.

13. The method as claimed in claim 11, wherein said summation of wave functions representing said input signal exists over a first interval, and said truncated summation of partial wave functions exists over a second interval, said second interval being M times shorter than said first interval, where M is the data compression ratio of the system.

14. The method as claimed in claim 12, wherein said real part of said transmitted signal has even and odd components, and wherein said detecting step comprises:
  detecting and outputting said even component;
  detecting and outputting said odd component;
  shifting the phase of said even component by 90 degrees and summing it with said odd component to reconstruct the non-transmitted imaginary part of said truncated summation of partial wave functions; and
  shifting the phase of said odd component by 90 degrees and summing it with said even component to reproduce the real part of said truncated summation of partial wave functions; and
  wherein said step of producing a partial wave spectrum utilizes said resulting real and imaginary parts.

15. The method as claimed in claim 13, wherein:
  said step of transmitting includes the step of producing a continuous series of wave packets, each said packet containing a summation of partial wave functions produced in said truncating step and having a period of a predetermined length of time, said period defining a bounded frame time;
  said system input signal represents a binary bit sequence in one frame time, where said frame time further defines the period of the truncation interval; and
  said method further comprises the step of eliminating any discontinuities that exist at the frame boundaries by multiplying the truncated summation of partial wave functions by an envelope function which is zero-valued at the frame boundaries.

16. The method claimed in claim 12, wherein:
  said transmitted truncated summation of partial wave functions experiences inherent electronic dispersion effects in said signal channel of said system, thereby producing a frequency-dependent phase shift factor; and wherein
  said method eliminates any such dispersion of the wave functions by the steps of:
  dividing said transmitted truncated summation of partial wave functions into even and odd components;
  shifting the phase of said even component by 90 degrees and summing it with said odd component to produce an imaginary part; and
  shifting the phase of said odd component by 90 degrees and summing it with said even component to produce a real part; and wherein
  said step of producing a partial wave spectrum utilizes said resulting real and imaginary parts.

17. The method as claimed in claim 11, wherein:
  said information signal is a high resolution analog signal;
  said step of producing a summation of wave functions includes producing a time dependent waveform representing a truncated Z-transformation of said input signal, the truncated Z-transformed signal defining a finite sum of a series of non-orthogonal linearly independent partial wave functions; and
  said method includes the steps of:
  generating an interpolated clock from said time dependent waveform;
  synchronously sampling said truncated Z-transformed signal under control of said interpolated clock; and
  said detecting step includes reconstructing said time dependent waveform to form a series of orthogonal linearly independent periodic functions;
  said partial wave spectrum producing step includes producing a signal representing an inverse Z-transform of said sampled truncated Z-transformed signal; and
  said deconvolving step includes deconvolving the inverse transform signal to reproduce said high resolution analog signal.

18. The method as claimed in claim 17, for use in a signal processing system having digital circuit components and a system clock operating at a prescribed frequency, said method recovering relatively high-resolution information contained in a bounded Z-transformation representation of a high resolution information signal;
  said step of producing a summation of wave functions includes producing a bounded Z-transformation representation of said information signal;
  said detecting step includes synchronously selecting portions of the transformed signal at a frequency M times the frequency of said system clock;
  said partial wave spectrum producing step includes producing a signal representing an inverse Z-transform of the selected portions of the Z-transformed signal; and
  said deconvolving step includes linearly deconvolving said inverse Z-transform signal to reproduce a high resolution equivalent of said information signal.

19. An information transreceive system having a signal transmission channel, comprising:
  a partial wave generator for receiving a relatively high resolution information input signal and generating a partial wave representation of said input signal for transmission through said transmission channel;
  an analytic signal converter for receiving the partial wave representation from said transmission channel and removing the effects of dispersion of the transmitted signal in said transmission channel;
  a partial wave detector for converting the dispersion free signal from said analytic converter to a relatively low resolution spectrum as compared to said input signal; and
  a linear deconvolver for reconstructing a relatively high resolution signal from said relatively low resolution spectrum.

20. The system as claimed in claim 19, wherein said linear deconvolver includes:
  a deconvolution matrix;
  means for selective multiplication of said relatively low resolution spectrum with said deconvolution matrix; and
  a zero crossing detector responsive to said selective multiplication means to thereby produce said relatively high resolution signal.

21. The system as claimed in claim 19, comprising
  a clock generator and data synchronizer at the transmitting and of said transmission channel for generating a relatively high speed clock and a relatively low speed sync signal, and wherein:
  said partial wave generator includes means for sampling said partial wave representation of said input signal under control of said high speed clock;
  said clock generator and data synchronizer including a divide-by-M circuit receiving said high speed clock and outputting a relatively low speed channel clock having a frequency 1/M times said high speed clock;

said partial wave generator including a summing circuit for summing said partial wave representation and said low speed channel clock to thereby produce a composite signal having a low frequency channel clock component for transmission through said transmission channel; and said partial wave generator is synchronously operated under control of said relatively low speed sync signal.

22. The system as claimed in claim 21, wherein said partial wave generator includes means responsive to said low speed sync signal to produce a continuous stream of partial wave packets, each wave packet being created during the time frame of a period of said low speed sync signal, thereby defining frame boundaries and a frame rate equal to the frequency of said low speed sync signal.

23. The system as claim in claim 21, wherein said clock generator and synchronizer includes means for coupling said low speed sync signal to said high speed clock for temporarily shifting the frequency of said high speed clock for a brief time period at said low speed sync signal rate, thereby introducing a low speed sync signal component into said composite signal being transmitted through said transmission channel.

24. The system as claimed in claim 23, comprising a clock detector, interpolator, and frame synchronizer at the receiving end of said transmission channel, including means for extracting said low frequency channel clock component from said transmitted composite signal;

means for generating a high speed receiver clock;

means for extracting said sync signal component from said transmitted composite signal;

means for synchronizing said high speed receiver clock with said extracted sync signal and extracted low frequency channel clock to set the frequency of said high speed receiver clock at M times the frequency of the extracted channel clock; and wherein said partial wave detector includes means for desampling said transmitted composite signal under control of and at the frequency of said high frequency receiver clock.

25. The system as claimed in claim 24, wherein said partial wave generator includes means responsive to said low speed sync signal to produce a continuous stream of partial wave packets, each wave packet being created during the time frame of a period of said low speed sync signal, thereby defining frame boundaries and a frame rate equal to the frequency of said low speed sync signal, and wherein said system further includes means for coupling said extracted sync signal to said partial wave detector for identifying frame times for synchronous operation of said partial wave detector.

26. The system as claimed in claim 24, wherein:

said high speed receiver clock generating means includes a voltage controlled oscillator, and a stable high frequency reference oscillator, said voltage controlled oscillator oscillating at said reference frequency;

said clock detector, interpolator and frame synchronizer includes a divide-by-M circuit for dividing the output of said voltage controlled oscillator by M;

said receiver clock generator includes a frequency comparator for comparing said extracted low frequency channel clock with said voltage controlled oscillator output divided by M, and producing a voltage proportional to the frequency difference for application to said voltage controlled oscillator for altering the frequency of said voltage controlled oscillator in such a direction to reduce said frequency difference to zero.

27. The system as claimed in claim 26, wherein said frequency comparator develops a pulse at its output when said extracted low frequency channel clock frequency is shifted discontinuously at sync signal times.

28. The system as claimed in claim 22, wherein said partial wave generator comprises:

a Z-transformer receiving said high resolution input signal and performing a Z-transform thereon;

a window function generator; and a multiplier for multiplying the output of the Z-transformer with said window function.

29. The system as claimed in claim 28, wherein:

said window function generator is adapted to produce a Gaussian function whose value is substantially zero at said frame boundaries.

30. The system as claimed in claim 19, wherein: said partial wave detector comprises an inverse Z-transformer.

31. Apparatus for recovering relatively high-resolution information from a partial wave representation of an information signal, comprising:

means for producing a partial wave representation of said information signal;

means for synchronously selecting portions of said partial wave representation of said information signal;

means for producing an inverse partial wave representation of the selected portions of the transformed signal; and means for linearly deconvolving said inverse partial wave representation to produce a high resolution equivalent of said information signal.

32. The apparatus as claimed in claim 31 for use in a system timed by a system clock of a prescribed frequency, wherein:

said means for synchronously selecting portions of said partial wave representation comprises waveform sampling circuitry; and said apparatus further comprises means for producing an interpolated clock at a frequency M times the frequency of said system clock, said interpolated clock defining the sampling rate of said sampling circuit.

33. The apparatus as claimed in claim 31, wherein:

said system is a transreceive system comprising a transmitting apparatus and a receiving apparatus for transmitting and receiving information over an information transmission channel;

said means for synchronously selecting portions of said partial wave representation comprises a waveform sampling means in said transmitting apparatus and a waveform desampling means in said receiving apparatus; and said interpolated clock producing means resides in said receiving apparatus for application to said desampling means as a desampling clock.

34. The apparatus as claimed in claim 32, wherein:

said system is an analyzer system comprising an optomechanical source of partial wave function;

said optomechanical source includes a laser device for producing a laser beam, and a sensor therefor for producing a laser fringe clock as a result of altering the path of said laser beam, said laser fringe clock defining said system clock; and said means for producing an interpolated clock includes means for correlating a high speed clock with a means for altering said path of said laser beam in a controlled manner.

35. A signal analyzer system, comprising:

a partial wave generator for generating a partial wave representation of a relatively high resolution information signal;

a clock generator for producing a relatively low frequency first clock and a relatively high frequency second clock;

means for synchronously selecting portions of said partial wave representation;

a partial wave detector for converting the synchronously selected portions to a relatively low resolution spectrum; and a linear deconvolver for reconstructing the relatively high resolution information signal from said rlatively low resolution spectrum; means for coupling said first clock to said partial wave generator as a timing reference; and means for coupling said second clock to said means for synchronously selecting as a timing reference.

36. The system as claimed in claim 35, wherein the ratio of the frequency of said second clock to the frequency of said first clock defines a data compression ratio M for said system.

37. The system as claimed in claim 36, wherein:

said partial wave generator comprises means for producing a dispersed truncated interferogram including a light beam source and a means for effecting variable phase retardation of said light beam; and M equals the ratio of the extent of phase retardation for a full spectrum interferogram to that of said truncated interferogram.

38. The system as claimed in claim 35, where said means for synchronously selecting portions of said partial wave representation comprises a data sampling circuit.

39. The system as claimed in claim 37, wherein:

said partial wave detector comprises an analytic converter for receiving the partial wave representation from said partial wave generator, and for removing the effects of dispersion of the dispersed truncated interferogram, said partial wave detector converting the dispersion free truncated interferogram to said relatively low resolution spectrum.

40. The system as claimed in claim 39, wherein:

said partial wave detector further including an inverse Z-transformer intercoupled between said analytic converter and said linear deconvolver.

41. The system as claimed in claim 35, wherein said linear deconvolver includes:

a deconvolution matrix;

means for selective multiplication of said relatively low resolution spectrum with said deconvolution matrix; and a zero crossing detector responsive to said selective multiplication means to thereby produce said relatively high resolution information signal.

42. The system as claimed in claim 35, wherein:

said means for synchronously selecting includes means for sampling said partial wave representation of said high resolution information signal under control of said high frequency clock;

said clock generator including a divide-by-M circuit receiving said high frequency clock and outputting said relatively low frequency clock having a frequency 1/M times said high frequency clock.

43. The system as claimed in claim 37, wherein:

said high frequency clock generating means includes a stable high frequency reference oscillator;

said clock generator includes:

a laser and laser beam detector, said laser beam being subjected to said variable phase retardation to product a laser fringe clock at the output of said laser beam detector;

a divide-by-M circuit for dividing the output of said high frequency reference oscillator; and a frequency comparator for comparing said laser fringe clock frequency with said high frequency reference oscillator output divided by M, and producing a voltage proportional to the frequency difference for application to said interferometer producing means for varying the rate of phase retardation in such a direction to reduce said frequency difference to zero.

44. The system as claimed in claim 35, wherein said partial wave generator comprises:

a Z-transformer generating device capable of producing said representation of a high resolution information signal;

a window function generator; and a multiplier for multiplying the output of the Z-transformer with said window function.

45. The system as claimed in claim 44, wherein:

said system comprises an interferometer having movable phase retardation means defining said Z-transformer generating device; and said window function is generated by a limited movement of said movable phase retardation means.

46. The system as claimed in claim 28, wherein:

said window function generator is adapted to produce a Gaussian function whose value is substantially zero at the extremes of said window function.

47. The system as claimed in claim 35 timed by low frequency clock of a prescribed frequency, wherein:

said means for synchronously selecting portions of said partial wave representation comprises waveform sampling circuitry; and said system further comprises means for producing an interpolated clock at a frequency M times the frequency of said low frequency clock, said interpolated clock defining the sampling rate of said sampling circuit.

48. The system as claimed in claim 35, wherein:

said partial wave detector includes an inverse Z-transformer for producing said relatively low resolution spectrum.

49. The system as claimed in claim 35, wherein said Z-transformer is a chirp Z-transformer.

* * * * *